US009992006B2

(12) United States Patent
Papasakellariou et al.

(10) Patent No.: US 9,992,006 B2
(45) Date of Patent: Jun. 5, 2018

(54) TRANSMISSION DIVERSITY AND MULTIPLEXING FOR HARQ-ACK SIGNALS IN COMMUNICATION SYSTEMS

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 15/796,319

(22) Filed: Oct. 27, 2017

(65) Prior Publication Data

US 2018/0062816 A1    Mar. 1, 2018

Related U.S. Application Data

(63) Continuation of application No. 15/262,698, filed on Sep. 12, 2016, now abandoned, which is a
(Continued)

(51) Int. Cl.
*H04W 4/00* (2018.01)
*H04L 5/00* (2006.01)
(Continued)

(52) U.S. Cl.
CPC .............. *H04L 5/0055* (2013.01); *H04L 1/06* (2013.01); *H04L 1/1692* (2013.01);
(Continued)

(58) Field of Classification Search
CPC ... H04L 5/0055; H04L 5/0053; H04L 5/1469; H04L 5/0023; H04L 1/06; H04L 1/1692; H04L 1/1861
(Continued)

(56) References Cited

U.S. PATENT DOCUMENTS 7,414,989 B2    8/2008    Kuchibhotla et al.
8,565,066 B2   10/2013    Nam
(Continued)

FOREIGN PATENT DOCUMENTS

CN    101340442    1/2009
CN    101478371    7/2009
(Continued)

OTHER PUBLICATIONS

R1-084047, Texas Instruments et al.: "Correction on TDD ACK/NAK Multiplexing Mapping Scheme for M=4", 3GPP TSG RAN WG1 #54bis, Sep. 29-Oct. 3, 2008.
(Continued)

*Primary Examiner* — Thai Hoang
(74) *Attorney, Agent, or Firm* — The Farrell Law Firm, P.C.

(57) ABSTRACT

A method and apparatus are described for a User Equipment (UE) to transmit in a control channel ACKnowledgement signals associated with a Hybrid Automatic Repeat reQuest process (HARQ-ACK signals) in response to receiving Transport Blocks (TBs) transmitted from a base station. The UE conveys the HARQ-ACK information by selecting one resource from multiple resources in the control channel and by selecting a constellation point of the modulation scheme for the HARQ-ACK signal. Transmission diversity is supported using different control channel resources that are already available to the UE without configuring additional resources. Design principles are described to optimally map the HARQ-ACK information to control channel resources and modulation constellation points for a Time Division Duplex (TDD) system and for a Frequency Division Duplex (FDD) system.

32 Claims, 12 Drawing Sheets

Related U.S. Application Data continuation of application No. 14/264,819, filed on Apr. 29, 2014, now Pat. No. 9,444,603, which is a continuation of application No. 12/907,606, filed on Oct. 19, 2010, now Pat. No. 9,438,402.

(60) Provisional application No. 61/252,854, filed on Oct. 19, 2009, provisional application No. 61/355,871, filed on Jun. 17, 2010.

(51) Int. Cl.

| | | |
|---|---|---|
| *H04L 5/14* | (2006.01) | |
| *H04L 1/18* | (2006.01) | |
| *H04L 1/16* | (2006.01) | |
| *H04L 1/06* | (2006.01) | |

(52) U.S. Cl.
CPC .......... *H04L 1/1812* (2013.01); *H04L 1/1861* (2013.01); *H04L 5/0053* (2013.01); *H04L 5/1469* (2013.01); *H04L 5/0023* (2013.01)

(58) Field of Classification Search
USPC .................. 370/329, 335–337, 342–345, 347
See application file for complete search history.

(56) References Cited

U.S. PATENT DOCUMENTS

| | | | |
|---|---|---|---|
| 8,848,629 B2* | 9/2014 | Han | H04L 5/0053 370/329 |
| 9,438,402 B2 | 9/2016 | Papasakellariou | |
| 9,444,603 B2 | 9/2016 | Papasakellariou | |
| 2004/0137896 A1 | 7/2004 | Sarkar et al. | |
| 2005/0201325 A1 | 9/2005 | Kang et al. | |
| 2006/0203779 A1 | 9/2006 | Attar et al. | |
| 2007/0076677 A1 | 4/2007 | Batariere et al. | |
| 2009/0201869 A1* | 8/2009 | Xu | H04L 1/1671 370/329 |
| 2009/0285193 A1 | 11/2009 | Kim et al. | |
| 2010/0172290 A1* | 7/2010 | Nam | H04L 1/1854 370/328 |
| 2010/0202433 A1 | 8/2010 | Ihm et al. | |
| 2011/0002309 A1 | 1/2011 | Park et al. | |
| 2011/0045860 A1* | 2/2011 | Nam | H04L 5/0023 455/509 |
| 2011/0141941 A1* | 6/2011 | Lee, II | H04L 1/0038 370/252 |
| 2011/0149717 A1 | 6/2011 | Dai et al. | |
| 2011/0211538 A1* | 9/2011 | Kakura | H04W 72/042 370/329 |
| 2011/0235599 A1 | 9/2011 | Nam et al. | |
| 2012/0039285 A1 | 2/2012 | Seo et al. | |
| 2012/0069815 A1* | 3/2012 | Aiba | H04L 5/001 370/329 |
| 2013/0028242 A1 | 1/2013 | Baker et al. | |
| 2013/0176982 A1* | 7/2013 | Han | H04L 1/1861 370/329 |
| 2013/0182619 A1* | 7/2013 | Tiirola | H04L 1/1621 370/280 |
| 2014/0233506 A1 | 8/2014 | Papasakellariou et al. | |

FOREIGN PATENT DOCUMENTS

| | | |
|---|---|---|
| CN | 101478379 | 7/2009 |
| CN | 101489255 | 7/2009 |
| EP | 1 628 430 | 2/2006 |
| EP | 1 806 867 | 7/2007 |
| EP | 2 093 953 | 8/2009 |
| EP | 2 161 870 | 3/2010 |
| JP | 2008-526090 | 7/2008 |
| JP | 2011-517383 | 6/2011 |
| JP | 2012-520000 | 8/2012 |
| JP | 2013-509073 | 3/2013 |
| RU | 2 328 827 | 7/2008 |
| RU | 2 340 105 | 11/2008 |
| RU | 2 348 009 | 2/2009 |
| RU | 2 364 027 | 8/2009 |
| RU | 2 381 635 | 2/2010 |
| WO | WO 2009/041785 | 4/2009 |
| WO | WO 2009/045734 | 4/2009 |
| WO | WO 2009/107985 | 9/2009 |
| WO | WO 2009/116754 | 9/2009 |
| WO | WO 2009/118621 | 10/2009 |
| WO | WO 2011/049354 | 4/2011 |

OTHER PUBLICATIONS

R1-094105, Samsung: "UL MIMO Text Proposal for TR 36.814", 3GPP TSG RAN WG1 Meeting #58bis, Oct. 12-16, 2009.
R1-083466, Texas Instruments et al.: "Support of Multi-bit ACK/NAK Transmission in TDD", 3GPP TSG-RAN1 Meeting #54, Aug. 18-22, 2008.
R1-084163, Samsung: "Further Refinement on ACK/NACK Multiplexing in TDD", 3GPP TSG RAN WG1 Meeting #55, Nov. 10-14, 2008.
Samsung, "UL ACK/NAK Transmission in LTE-A", R1-092668, 3GPP TSG RAN WG1 #57bis, Jul. 3, 2009.
ZTE, "ACK/NACK Design for LTE-Advanced", R1-093208, TSG-RAN WG1 #58, Jun. 25-Aug. 29, 2009.
ZTE, "Uplink Control Channel Design for LTE-Advanced", R1-093820, TSG-RAN WG1 #58bis, Oct. 12-16, 2009.
3rd Generation Partnership Project; Technical Specification Group Radio Access Network; Evolved Universal Terrestrial Radio Access (E-UTRA); Physical Layer Procedures (Release 8), 3GPP TS 36.213 V8.8.0, Sep. 2009.
LG Electronics, "PUCCH ACK/NACK Configuration and CCE Index Mapping", R1-081003, 3GPP TSG RAN WG1#52, Feb. 11-15, 2008, 4 pages.
Texas Instruments, "Support of Multiple ACK/NAK Transmission in TDD", R1-081988, 3GPP TSG RAN WG1 #53, May 5-9, 2008.
Russian Office Action dated Jun. 26, 2015 issued in counterpart application No. 2013141799/08, 17 pages.
Australian Examination Report dated Aug. 7, 2015 issued in counterpart application No. 2014202317, 5 pages.
3rd Generation Partnership Project; Technical Specification Group Radio Access Network; Evolved Universal Terrestrial Radio Access (E-UTRA); Physical Layer Procedures (Release 8), 3GPP TS 36.213 V8.4.0, Sep. 2008.
ZTE, "Transmit Diversity for Pucch in LTE-A", R1-092478, 3GPP TSG-RAN WG1#57bis, Jun. 29-Jul. 3, 2009, 7 pages.
Huawei, "PUCCH Design for Carrier Aggregation", R1-093838, 3GPP TSG RAN WG1 Meeting #58bis, Oct. 12-16, 2009, 6 pages.
Samsung, "Transmit Diversity for PUCCH Format 1/1a/b", R1-101610, 3GPP TSG RAN WG1 #60, Feb. 22-26, 2010, 4 pages.
European Search Report dated May 29, 2017 issued in counterpart application No. 10825179.4-1874, 9 pages.
Korean Office Action dated Jun. 26, 2017 issued in counterpart application No. 10-2012-7009930, 8 pages.

* cited by examiner

US 9,992,006 B2

TRANSMISSION DIVERSITY AND MULTIPLEXING FOR HARQ-ACK SIGNALS IN COMMUNICATION SYSTEMS

PRIORITY

This application is Divisional Application of U.S. patent application Ser. No. 15/262,698, which was filed on Sep. 12, 2016, which is a Continuation Application of U.S. patent application Ser. No. 14/264,819, which was filed in the U.S. Patent and Trademark Office on Apr. 29, 2014, and issued as U.S. Pat. No. 9,444,603 on Sep. 13, 2016, which is a continuation of U.S. patent application Ser. No. 12/907,606, and issued as U.S. Pat. No. 9,438,402 on Sep. 6, 2016, which was filed in the U.S. Patent and Trademark Office on Oct. 19, 2010, and claims priority under 35 U.S.C. § 119(e) to Provisional Application Nos. 61/252,854, and 61/355,871, entitled "Transmission Diversity and Multiplexing for HARQ-ACK Signals in TDD Communication Systems," which were filed in the United States Patent and Trademark Office on Oct. 19, 2009, and Jun. 17, 2010, respectively, the content of each of which is incorporated herein by reference.

BACKGROUND OF THE INVENTION

1. Field of the Invention

The present invention is directed generally to wireless communication systems, and more specifically, to transmission methods for acknowledgement signals including the application of transmission diversity.

2. Description of the Art

A communication system includes a DownLink (DL), supporting transmissions of signals from a base station (Node B) to User Equipments (UEs), and an UpLink (UL), supporting transmissions of signals from UEs to the Node B. A UE, also commonly referred to as a terminal or a mobile station, may be fixed or mobile and may be a wireless device, a cellular phone, a personal computer device, and the like. A Node B is generally a fixed station and may also be referred to as a Base Transceiver System (BTS), an access point, or some other terminology.

The UL signals from a UE include data signals, carrying the information content, control signals, and Reference Signals (RS), which are also known as pilot signals. The UL control signals include acknowledgement signals associated with the application of a Hybrid Automatic Repeat reQuest (HARQ) process and are in response to the correct or incorrect, respectively, reception of data Transport Blocks (TBs) by the UE. UL control signals can be transmitted separately from data signals in a Physical Uplink Control CHannel (PUCCH) or, they can be transmitted together with data signals, in a Physical Uplink Shared CHannel (PUSCH) over a Transmission Time Interval (TTI). The UE receives TBs from the Node B through a Physical Downlink Shared CHannel (PDSCH) and the Node B schedules transmission of the TBs in the PDSCH or transmission of the TBs from the UE in the PUSCH through Downlink Control Information (DCI) formats transmitted in a Physical Downlink Control CHannel (PDCCH).

A PUCCH structure for the HARQ ACKnowledgement (HARQ-ACK) signal transmission in the UL TTI, which, for simplicity, is assumed to include one sub-frame, is illustrated in FIG. 1. The sub-frame 110 includes two slots. Each slot 120 includes $N_{symb}^{UL}$ symbols for the transmission of HARQ-ACK signals 130, or of RS 140 which enable coherent demodulation of the HARQ-ACK signals. Each symbol further includes a Cyclic Prefix (CP) to mitigate interference due to channel propagation effects. The transmission in the first slot may be at a different part of the operating BandWidth (BW) than the second slot to provide frequency diversity. The operating BW is assumed to consist of frequency resource units, which will be referred to as Resource Blocks (RBs). Each RB is further assumed to include $N_{sc}^{RB}$ sub-carriers, or Resource Elements (REs), and a UE transmits HARQ-ACK signals and RS over one RB 150.

A structure for the HARQ-ACK signal transmission in one slot of the PUCCH is illustrated in FIG. 2. The transmission in the other slot is assumed to effectively have the same structure. The HARQ-ACK bits b 210 modulate 220 a "Constant Amplitude Zero Auto-Correlation (CAZAC)" sequence 230, using, for example, Binary Phase Shift Keying (BPSK) or Quaternary Phase Shift Keying (QPSK) modulation, which is then transmitted after performing an Inverse Fast Frequency Transform (IFFT) as it is next described. The RS 240 is transmitted through the non-modulated CAZAC sequence.

An example of CAZAC sequences is given by Equation (1).

$$c_k(n) = \exp\left[\frac{j2\pi k}{L}\left(n + n\frac{n+1}{2}\right)\right] \quad (1)$$

In Equation (1), L is the length of the CAZAC sequence, n is the index of an element of the sequence n={0, 1, ..., L−1}, and k is the index of the sequence. If L is a prime number, there are L−1 distinct sequences which are defined as k ranges in {0, 1, ..., L−1}. If an RB is comprised of an even number of REs, such as, for example, $N_{sc}^{RB}=12$, CAZAC sequences with an even length can be directly generated through a computer search for sequences satisfying the CAZAC properties.

FIG. 3 illustrates a UE transmitter structure for the HARQ-ACK signal in the PUCCH. The frequency-domain version of a computer generated CAZAC sequence 310 is assumed. The first RB and second RB are selected 320 for transmission 330 of the CAZAC sequence in the first and second slots, respectively, an IFFT is performed 340, and a Cyclic Shift (CS), as it is subsequently described, applies to the output 350. Finally, the CP 360 and filtering 370 are applied to the transmitted signal 380. A UE is assumed to apply zero padding in REs that are not used for its signal transmission and in guard REs (not shown). Moreover, for brevity, additional transmitter circuitry such as a digital-to-analog converter, analog filters, amplifiers, and transmitter antennas as they are known in the art, are not shown.

The reverse (complementary) transmitter functions are performed by the Node B for the HARQ-ACK signal reception in the PUCCH. This is illustrated in FIG. 4, where the reverse operations of those in FIG. 3 apply. An antenna receives the RF analog signal and after further processing units (such as filters, amplifiers, frequency down-converters, and analog-to-digital converters) the received digital signal 410 is filtered 420 and the CP is removed 430. Subsequently, the CS is restored 440, a Fast Fourier Transform (FFT) 450 is applied, the first RB and the second RB of the signal transmission 460 in the first slot and in the second slot, respectively, are selected 465, and the signal is correlated 470 with the replica 480 of the CAZAC sequence. The output 490 can then be passed to a channel estimation unit, such as a time-frequency interpolator, in the case of RS, or to detect the transmitted HARQ-ACK information.

Different CSs of the same CAZAC sequence provide orthogonal CAZAC sequences and can be assigned to different UEs for orthogonal multiplexing of signal transmissions in the same PUCCH RB. This principle is illustrated in FIG. 5. In order for the multiple CAZAC sequences 510, 530, 550, 570 generated respectively from the multiple CSs 520, 540, 560, 580 of the same root CAZAC sequence to be orthogonal, the CS value Δ 590 should exceed the channel propagation delay spread D (including time uncertainty errors and filter spillover effects). If $T_S$ is the symbol duration, the number of such CSs is equal to the mathematical floor, i.e., rounding down, of the ratio $T_S/D$.

In addition to orthogonal multiplexing of HARQ-ACK signal transmissions from different UEs in the same RB using different CS of a CAZAC sequence, orthogonal multiplexing can also be achieved in the time domain using Orthogonal Covering Codes (OCCs). For example, in FIG. 2, the HARQ-ACK signal can be modulated by a length-4 OCC, such as a Walsh-Hadamard (WH) OCC, while the RS can be modulated by a length-3 OCC, such as a DFT OCC (not shown for brevity). In this manner, the PUCCH multiplexing capacity is increased by a factor of 3 (determined by the OCC with the smaller length). The sets of WH OCCs, $\{W_0, W_1, W_2, W_3\}$, and DFT OCCs, $\{D_0, D_1, D_2\}$, are:

$$\begin{bmatrix} W_0 \\ W_1 \\ W_2 \\ W_3 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}, \begin{bmatrix} D_0 \\ D_1 \\ D_2 \end{bmatrix} = \begin{bmatrix} 1 & 1 & 1 \\ 1 & e^{-j2\pi/3} & e^{-j4\pi/3} \\ 1 & e^{-j4\pi/3} & e^{-j2\pi/3} \end{bmatrix}.$$

Table 1 illustrates a mapping for a PUCCH resource $n_{PUCCH}$ used for HARQ-ACK signal transmission, to an OCC $n_{oc}$ and a CS α assuming a total of 12 CS of the CAZAC sequence per PUCCH symbol.

TABLE 1

HARQ-ACK Resource Mapping to OC and CS

| | OC $n_{oc}$ for HARQ-ACK and for RS | | |
|---|---|---|---|
| CS α | $W_0, D_0$ | $W_1, D_1$ | $W_3, D_2$ |
| 0 | $n_{PUCCH} = 0$ | | $n_{PUCCH} = 12$ |
| 1 | | $n_{PUCCH} = 6$ | |
| 2 | $n_{PUCCH} = 1$ | | $n_{PUCCH} = 13$ |
| 3 | | $n_{PUCCH} = 7$ | |
| 4 | $n_{PUCCH} = 2$ | | $n_{PUCCH} = 14$ |
| 5 | | $n_{PUCCH} = 8$ | |
| 6 | $n_{PUCCH} = 3$ | | $n_{PUCCH} = 15$ |
| 7 | | $n_{PUCCH} = 9$ | |
| 8 | $n_{PUCCH} = 4$ | | $n_{PUCCH} = 16$ |
| 9 | | $n_{PUCCH} = 10$ | |
| 10 | $n_{PUCCH} = 5$ | | $n_{PUCCH} = 17$ |
| 11 | | $n_{PUCCH} = 11$ | |

The DCI formats are transmitted in elementary units, which are referred to as Control Channel Elements (CCEs). Each CCE consists of a number of REs and the UEs are informed of the total number of CCEs, $N_{CCE}$, through the transmission of a Physical Control Format Indicator CHannel (PCFICH) by the Node B. For a Frequency Division Duplex (FDD) system and PDSCH transmission scheduled by a DCI format, the UE determines $n_{PUCCH}$ from the first CCE, $n_{CCE}$ of the DCI format with the addition of an offset $N_{PUCCH}$ that is configured by higher layers (such as the Radio Resource Control (RRC) layer) and $n_{PUCCH} = n_{CCE} + N_{PUCCH}$. For a Time Division Duplex (TDD) system, the determination of $n_{PUCCH}$ is more complex, as further discussed below, but the same mapping principle using the CCEs of the DCI format scheduling the corresponding PDSCH transmission applies.

In TDD systems, DL and UL transmissions occur in different sub-frames. For example, in a frame including 10 sub-frames, some sub-frames may be used for DL transmissions and some sub-frames may be used for UL transmissions.

FIG. 6 illustrates a 10 millisecond (ms) frame structure which includes two identical half-frames. Each 5 ms half-frame 610 is divided into 8 slots 620 and 3 special fields: a DL ParT Symbol (DwPTS) 630, a Guard Period (GP) 640, and an UL ParT Symbol (UpPTS) 650. The length of DwPTS+GP+UpPTS is one sub-frame (1 ms) 660. The DwPTS may be used for the transmission of synchronization signals from the Node B while the UpPTS may be used for the transmission of random access signals from UEs. The GP facilitates the transition between DL and UL transmissions by absorbing transient interference.

In TDD systems, the number of DL and UL sub-frames per frame can be different and multiple DL sub-frames may be associated with a single UL sub-frame. The association between the multiple DL sub-frames and the single UL sub-frame is that HARQ-ACK information generated in response to PDSCH transmissions in the multiple DL sub-frames needs to be conveyed in the single UL sub-frame.

A first method for a UE to convey HARQ-ACK information in a single UL sub-frame, in response to PDSCH transmissions in multiple DL sub-frames, is HARQ-ACK bundling where the UE sends a positive ACKnowledgement (ACK) only if all TBs in the respective PDSCHs are received correctly and sends a Negative ACKnowledgement (NACK) in other cases. Therefore, HARQ-ACK bundling results in unnecessary retransmissions and reduced DL throughput as a NACK is sent even when the UE correctly receives some, but not all, TBs in the respective PDSCHs. Another method for a UE to convey HARQ-ACK information in a single UL sub-frame, in response to TBs in the respective PDSCHs in multiple DL sub-frames, is HARQ-ACK multiplexing, which is based on PUCCH resource selection for the HARQ-ACK signal transmission as it is subsequently described. The invention primarily focuses on HARQ-ACK multiplexing.

In one embodiment, there could be 1, 2, 3, 4 or 9 DL sub-frames associated with 1 UL sub-frame. Therefore, assuming that a UE receives a maximum of 2 TBs per PDSCH in a DL sub-frame, the number of HARQ-ACK bits to be transmitted in the UL sub-frame can be 1, 2, 3, 4, 6, 8, 9 or 18. Supporting such a dynamic range of number of HARQ-ACK bits is typically not desirable as it is difficult to ensure, at the Node B, the required detection reliability, including the absence of an expected HARQ-ACK signal transmission due to a missed DCI format for PDSCH transmission to the UE (referred to as DTX). To reduce the number of HARQ-ACK bits, bundling can be applied in the spatial domain, resulting in a single HARQ-ACK bit in the case of 2 TBs in a PDSCH. This reduces the number of possible HARQ-ACK bits in the UL sub-frame to 1, 2, 3, 4, or 9. Further bundling in the time domain can be applied to the case of 9 HARQ-ACK bits so that the maximum number is always reduced to 4 HARQ-ACK bits. HARQ-ACK multiplexing can then be used to transmit up to 4 HARQ-ACK bits.

With HARQ-ACK multiplexing, a UE conveys a HARQ-ACK value (ACK, NACK, or DTX) for each of the multiple DL sub-frames even if PDSCH transmission to that UE did not occur in all DL sub-frames. For example, if there are 4 DL sub-frames for which HARQ-ACK information needs to be transmitted in the same UL sub-frame, then, with HARQ-ACK multiplexing, the HARQ-ACK signal from a UE conveys HARQ-ACK information for each of the 4 DL sub-frames even if the PDSCH transmission to the UE occurs in less than 4 DL sub-frames.

Table 2 illustrates the HARQ-ACK multiplexing in the case in which the UE conveys HARQ-ACK information for 2 DL sub-frames in the same UL sub-frame (a HARQ-ACK state consists of 2 HARQ-ACK values). The UE selects one PUCCH resource, $n_{PUCCH}(0)$ or $n_{PUCCH}(1)$, and one QPSK constellation point (on a constellation diagram) for the transmission of the QPSK modulated HARQ-ACK signal depending on the HARQ-ACK information. Each PUCCH resource is determined from the first CCE of the DCI format for the respective PDSCH transmission in each of the 2 DL sub-frames.

TABLE 2

HARQ-ACK Multiplexing for 2 DL Sub-Frames

| HARQ-ACK(0), HARQ-ACK(1) | $n_{PUCCH}$ | QPSK |
|---|---|---|
| ACK, ACK | $n_{PUCCH}(1)$ | 1, 1 |
| ACK, NACK/DTX | $n_{PUCCH}(0)$ | 0, 1 |
| NACK/DTX, ACK | $n_{PUCCH}(1)$ | 0, 0 |
| NACK/DTX, NACK | $n_{PUCCH}(1)$ | 1, 0 |
| NACK, DTX | $n_{PUCCH}(0)$ | 1, 0 |
| DTX, DTX | N/A | N/A |

FIG. 7 illustrates the HARQ-ACK signal transmission process in Table 2. If no DCI format is received by the UE, there is no HARQ-ACK signal transmission. If the UE receives a DCI format in the second DL sub-frame 702, it uses the respective first CCE to determine $n_{PUCCH}(1)$ 710 for the HARQ-ACK signal transmission having {NACK/DTX, ACK} 722, {ACK, ACK} 724, and {NACK/DTX, NACK} 726 as the possible HARQ-ACK states which are then mapped to QPSK constellation points. If the UE receives a DCI format only in the first DL sub-frame 704, it uses the respective first CCE to determine $n_{PUCCH}(0)$ 730 for the HARQ-ACK signal transmission having {ACK, NACK/DTX} 742, and {NACK, DTX} 744 as the possible HARQ-ACK states which are then mapped to QPSK constellation points.

Table 2 illustrates the HARQ-ACK multiplexing in the case in which the UE conveys HARQ-ACK information for 2 DL sub-frames in the same UL sub-frame (a HARQ-ACK state consists of 2 HARQ-ACK values). The UE selects one PUCCH resource, $n_{PUCCH}(0)$ or $n_{PUCCH}(1)$, and one QPSK constellation point for the transmission of the QPSK modulated HARQ-ACK signal depending on the HARQ-ACK information. Each PUCCH resource is determined from the first CCE of the DCI format for the respective PDSCH transmission in each of the 2 DL sub-frames.

Table 3 illustrates the HARQ-ACK multiplexing in the case in which the UE conveys HARQ-ACK information for 3 DL sub-frames in the same UL sub-frame (a HARQ-ACK state consists of 3 HARQ-ACK values). The UE selects one PUCCH resource, $n_{PUCCH}(0)$, or $n_{PUCCH}(1)$, or $n_{PUCCH}(2)$, and one QPSK constellation point for the transmission of the QPSK modulated HARQ-ACK signal, depending on the HARQ-ACK information. Each PUCCH resource is determined from the first CCE of the DCI format for the respective PDSCH transmission in each of the 3 DL sub-frames. Explicit DTX indication is possible through the inclusion in the DCI formats for PDSCH transmission of a Downlink Assignment Index (DAI) Information Element (IE) indicating the cumulative number of assigned PDSCH transmission(s) to the UE.

TABLE 3

HARQ-ACK Multiplexing for 3 DL Sub-Frames

| Entry Number | HARQ-ACK(0), HARQ-ACK(1), HARQ-ACK(2) | $n_{PUCCH}$ | QSPK |
|---|---|---|---|
| 1 | ACK, ACK, ACK | $n_{PUCCH}(2)$ | 1, 1 |
| 2 | ACK, ACK, NACK/DTX | $n_{PUCCH}(1)$ | 1, 1 |
| 3 | ACK, NACK/DTX, ACK | $n_{PUCCH}(0)$ | 1, 1 |
| 4 | ACK, NACK/DTX, NACK/DTX | $n_{PUCCH}(0)$ | 0, 1 |
| 5 | NACK/DTX, ACK, ACK | $n_{PUCCH}(2)$ | 1, 0 |
| 6 | NACK/DTX, ACK, NACK/DTX | $n_{PUCCH}(1)$ | 0, 0 |
| 7 | NACK/DTX, NACK/DTX, ACK | $n_{PUCCH}(2)$ | 0, 0 |
| 8 | DTX, DTX, NACK | $n_{PUCCH}(2)$ | 0, 1 |
| 9 | DTX, NACK, NACK/DTX | $n_{PUCCH}(1)$ | 1, 0 |
| 10 | NACK, NACK/DTX, NACK/DTX | $n_{PUCCH}(0)$ | 1, 0 |
| 11 | DTX, DTX, DTX | N/A | N/A |

Finally, Table 4 describes the HARQ-ACK multiplexing in case the UE conveys HARQ-ACK information for 4 DL sub-frames in the same UL sub-frame (a HARQ-ACK state consists of 3 HARQ-ACK values). The UE selects one PUCCH resource, $n_{PUCCH}(0)$, or $n_{PUCCH}(1)$, $n_{PUCCH}(2)$, or $n_{PUCCH}(3)$, and one QPSK constellation point for the transmission of the QPSK modulated HARQ-ACK signal depending on the HARQ-ACK information. Each PUCCH resource is determined from the first CCE of the DCI format for the respective PDSCH transmission in each of the 4 DL sub-frames.

TABLE 4

HARQ-ACK Multiplexing for 4 DL Sub-Frames

| Entry Number | HARQ-ACK(0), HARQ-ACK(1), HARQ-ACK(2), HARQ-ACK(3) | $n_{PUCCH}$ | QPSK |
|---|---|---|---|
| 1 | ACK, ACK, ACK, ACK | $n_{PUCCH}(1)$ | 1, 1 |
| 2 | ACK, ACK, ACK, NACK/DTX | $n_{PUCCH}(1)$ | 1, 0 |
| 3 | NACK/DTX, NACK/DTX, NACK, DTX | $n_{PUCCH}(2)$ | 1, 1 |
| 4 | ACK, ACK, NACK/DTX, ACK | $n_{PUCCH}(1)$ | 1, 0 |
| 5 | NACK, DTX, DTX, DTX | $n_{PUCCH}(0)$ | 1, 0 |
| 6 | ACK, ACK, NACK/DTX, NACK/DTX | $n_{PUCCH}(1)$ | 1, 0 |
| 7 | ACK, NACK/DTX, ACK, ACK | $n_{PUCCH}(3)$ | 0, 1 |
| 8 | NACK/DTX, NACK/DTX, NACK/DTX, NACK | $n_{PUCCH}(3)$ | 1, 1 |
| 9 | ACK, NACK/DTX, ACK, NACK/DTX | $n_{PUCCH}(2)$ | 0, 1 |
| 10 | ACK, NACK/DTX, NACK/DTX, ACK | $n_{PUCCH}(0)$ | 0, 1 |
| 11 | ACK, NACK/DTX, NACK/DTX, NACK/DTX | $n_{PUCCH}(0)$ | 1, 1 |
| 12 | NACK/DTX, ACK, ACK, ACK | $n_{PUCCH}(3)$ | 0, 1 |
| 13 | NACK/DTX, NACK, DTX, DTX | $n_{PUCCH}(1)$ | 0, 0 |
| 14 | NACK/DTX, ACK, ACK, NACK/DTX | $n_{PUCCH}(2)$ | 1, 0 |
| 15 | NACK/DTX, ACK, NACK/DTX, ACK | $n_{PUCCH}(3)$ | 1, 0 |
| 16 | NACK/DTX, ACK, NACK/DTX, NACK/DTX | $n_{PUCCH}(1)$ | 0, 1 |
| 17 | NACK/DTX, NACK/DTX, ACK, ACK | $n_{PUCCH}(3)$ | 0, 1 |
| 18 | NACK/DTX, NACK/DTX, ACK, NACK/DTX | $n_{PUCCH}(2)$ | 0, 0 |
| 19 | NACK/DTX, NACK/DTX, NACK/DTX, ACK | $n_{PUCCH}(3)$ | 0, 0 |
| 20 | DTX, DTX, DTX, DTX | N/A | N/A |

The main drawback of the mapping in Table 4 is that several HARQ-ACK states are mapped to the same PUCCH resource and QPSK constellation point (i.e., they are overlapping). For example, 3 different HARQ-ACK states in Table 4 (entries 2, 4, and 6) are mapped to PUCCH resource $n_{PUCCH}(1)$ and QSPK constellation point {1, 0}. Similarly, 3 other HARQ-ACK states (entries 7, 12, and 17) are mapped to PUCCH resource $n_{PUCCH}(3)$ and QSPK constellation point {0, 1}. This overlap is unavoidable since the 20 HARQ-ACK states in Table 4 must be mapped to a maximum of 16 positions corresponding to 4 PUCCH resources and 4 QPSK constellation points.

A consequence of the overlapping HARQ-ACK states in Table 4 is loss of system throughput, as the Node B typically needs to assume that non-unique values correspond to NACK or DTX and perform HARQ retransmissions although the UE may have actually correctly received the TBs of the respective PDSCHs. If the Node B schedules PDSCH transmissions to a UE in the first and second sub-frames, it is generally unable to schedule PDSCH transmissions to the UE in the third or fourth sub-frames (entries 2, 4, and 6). Similarly, if the Node B schedules PDSCH transmissions to a UE in the third and fourth sub-frames, it is generally unable to schedule PDSCH transmissions to the UE in the first or second sub-frame (entries 7, 12, and 17). Therefore, the mapping in Table 4 should be improved to minimize or avoid the overlapping of HARQ-ACK states. Specific rules should also be defined for iteratively constructing mapping Tables as the number of HARQ-ACK states increases.

For a UE equipped with more than one transmitter antenna, Transmitter Diversity (TxD) can enhance the reliability of the received signal at the Node B by providing spatial diversity. For HARQ-ACK signal transmission, because of the OCC applied across PUCCH symbols and because of possible CS hopping across PUCCH symbols within a slot, the application of TxD methods using space-time coding is problematic. Conversely, Orthogonal Resource Transmission Diversity (ORTD), where each UE transmitter antenna uses a separate (orthogonal) PUCCH resource, can directly apply.

FIG. 8 illustrates the application of ORTD. The first UE transmitter antenna uses a first PUCCH resource 810, associated with the first CCE used to transmit the DCI format, and the second UE transmitter antenna uses a second PUCCH resource 820, which can be assumed to be associated with a second CCE used to transmit the DCI format. Both antennas transmit the same information, which is either an ACK 830 and 850, or a NACK 840 and 860.

Although ORTD requires additional PUCCH resources, a UE may often have available more than one orthogonal PUCCH resource for HARQ-ACK signal transmission. For example, when the DCI format scheduling the PDSCH transmission uses more than one CCE for its transmission, each CCE provides an orthogonal PUCCH resource for HARQ-ACK signal transmission. However, without additional mechanisms, such as a separate configuration of an additional orthogonal PUCCH resource for UEs applying ORTD, the use of ORTD for HARQ-ACK signal transmission is generally problematic as the DCI format scheduling the respective PDSCH transmission may consist of only one CCE and the next CCE may be the first CCE used for the transmission of another DCI format scheduling PDSCH transmission to another UE.

The HARQ-ACK multiplexing used for TDD systems can be extended for FDD systems using Carrier Aggregation (CA) where a UE receives multiple PDSCH transmissions in multiple DL cells in the same TTI. CA is fundamentally the parallelization of single-cell operation to multi-cell operation. For each PDSCH reception, the UE needs to convey to the Node B one HARQ-ACK value (ACK, NACK, or DTX) in case the PDSCH conveyed one TB and two HARQ-ACK values ({ACK, ACK}, {ACK, NACK}, {NACK, ACK}, {NACK, NACK} or DTX) in case the PDSCH conveyed two TBs.

Therefore, there is a need to enable ORTD for HARQ-ACK signal transmission with multiplexing by utilizing available CCEs used for transmission of respective DCI formats.

There is another need to optimize the use of PUCCH resources for HARQ-ACK signal transmission using multiplexing.

There is another need to minimize or avoid overlapping of HARQ-ACK states onto the same PUCCH resources or QPSK constellation points and to define iterative mapping rules as the number of HARQ-ACK states increases.

Finally, there is another need to support HARQ-ACK multiplexing for FDD systems using carrier aggregation.

SUMMARY OF THE INVENTION

Accordingly, the present invention has been designed to solve at least the aforementioned limitations and problems in the prior art and to provide the following advantages. An aspect of the present invention is to provide methods and an apparatus for a UE, operating either in a TDD system or in an FDD system with CA, to transmit to a base station a HARQ-ACK signal using ORTD where the HARQ-ACK signal is transmitted from a first UE antenna using a first resource associated with the reception of a first TB and transmitted from a second UE antenna using a second resource associated with the reception of a second TB.

In accordance with another aspect of the present invention, a method is provided for a UE to transmit to a base station a HARQ-ACK signal using resource multiplexing where, for the same size of HARQ-ACK information, a first mapping is used when the UE operates in a TDD system and a second mapping is used when the UE operates in an FDD system and where the first mapping includes overlapping of different HARQ-ACK states onto the same resource and the second mapping always associates different HARQ-ACK states with different resources. In either mapping, if the last value of the HARQ-ACK information is an ACK, the control resource corresponding to the DCI format used for scheduling the last received PDSCH is selected for the HARQ-ACK signal transmission.

In accordance with another aspect of the present invention, a method and apparatus are provided for a UE to transmit to a base station a HARQ-ACK signal using resource multiplexing where the UE utilizes a first control channel resource when it receives one TB and it utilizes a first and a second control channel resource when it receives two TBs where the UE predicts the second control channel resource from the first control channel resource.

In accordance with another aspect of the present invention, a method is provided for a User Equipment (UE) to transmit to a base station an acknowledgement signal, wherein the acknowledgement signal conveys acknowledgement information about the reception by the UE of a number Transport Blocks (TBs) received by the UE over multiple transmission time intervals and is transmitted by selecting one resource from multiple resources of a control channel and one constellation point from multiple constellation points of a modulation scheme, the method comprises transmitting the acknowledgement signal to provide acknowledgement information which contains explicit indication of missed reception of a TB when the acknowledgment information consists of 2 or 3 bits, and transmitting the acknowledgement signal to provide acknowledgement information which does not contain explicit indication of missed reception of a TB when the acknowledgment information consists of 4 bits.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EMBODIMENTS OF THE PRESENT INVENTION

Various embodiments of the present invention will now be described more fully with reference to the accompanying drawings. This invention may, however, be embodied in many different forms and should not be construed as limited to the embodiments set forth herein. Rather, these embodiments are provided so that this disclosure will be thorough, complete and will fully convey the scope of the invention to those skilled in the art.

Additionally, although the present invention is described in relation to a Single-Carrier Frequency Division Multiple Access (SC-FDMA) communication system, it also applies to all Frequency Division Multiplexing (FDM) systems in general and to an Orthogonal Frequency Division Multiple Access (OFDMA), OFDM, FDMA, Discrete Fourier Transform (DFT)-spread OFDM, DFT-spread OFDMA, SC-OFDMA, and SC-OFDM in particular.

An embodiment of the present invention considers the application of ORTD for the HARQ-ACK signal transmission when the DCI formats scheduling the respective PDSCH transmissions cannot be assumed to have been transmitted using more than one CCE. Although the embodiment assumes HARQ-ACK multiplexing, the same principles apply in the case of HARQ-ACK bundling. Two UE transmitter antennas are assumed. In the case of more than 2 UE transmitter antennas, virtualization to 2 UE transmitter antennas can be used. The embodiment further considers the case of M=2 DL sub-frames (TDD system), for which the associated HARQ-ACK signal transmissions are in the same UL sub-frame but the same principles apply for an FDD system with CA over M=2 DL cells. The PUCCH resource for HARQ-ACK signal transmission corresponding to the first CCE used to transmit DCI format j, with j=0, ..., M−1 is denoted as $n_{PUCCH}(j)$.

Figure 9:
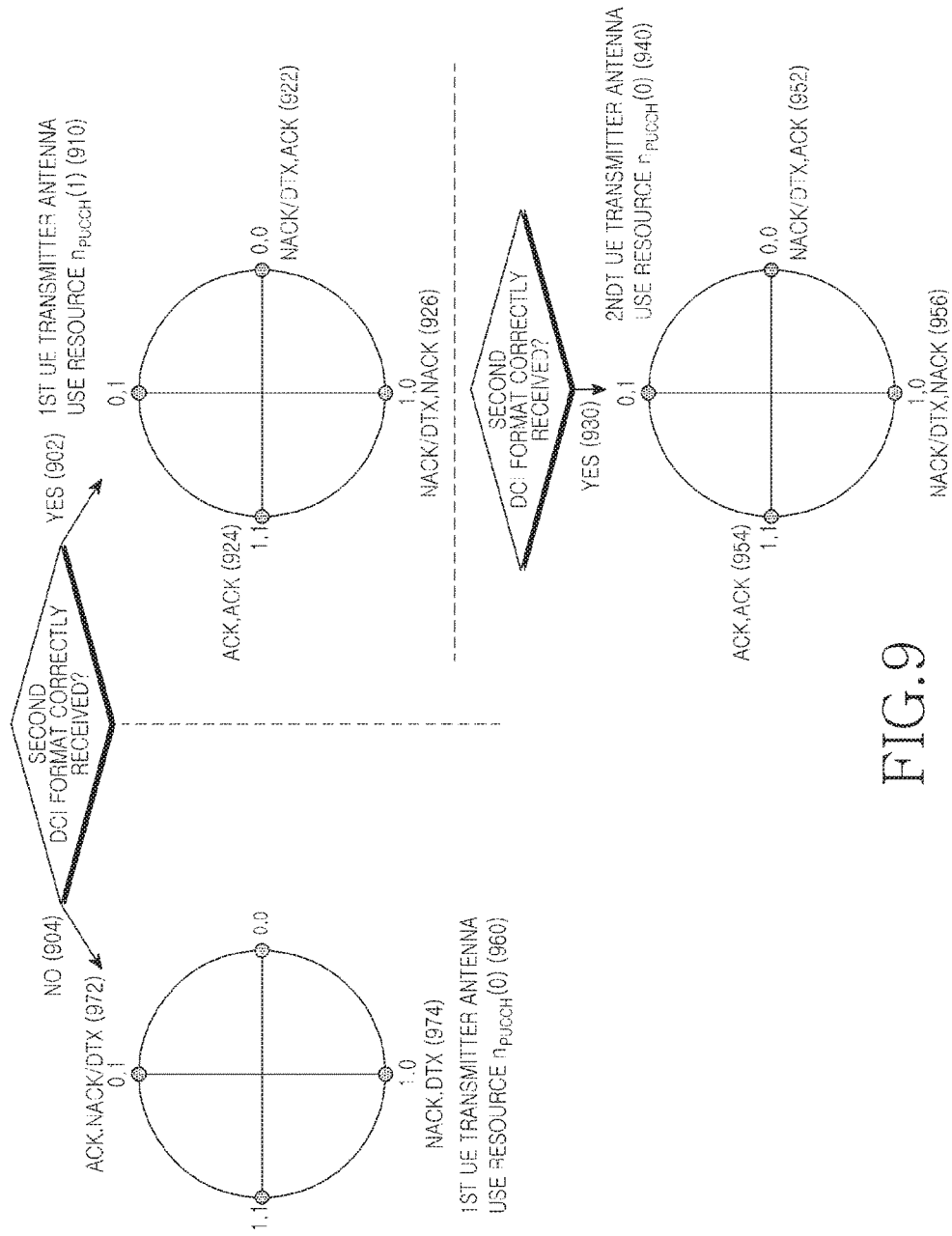
FIG. 9 is a diagram illustrating the HARQ-ACK signal transmission with multiplexing using ORTD.

FIG. 9 illustrates an embodiment for HARQ-ACK signal transmission with multiplexing using ORTD. If the UE receives a DCI format in a second DL sub-frame 902, it uses the corresponding first CCE to determine $n_{PUCCH}(1)$ 910 for the HARQ-ACK signal transmission from the first antenna having {NACK/DTX, ACK} 922, {ACK, ACK} 924, and {NACK/DTX, NACK} 926 as the possible HARQ-ACK states in the QPSK constellation. If the UE also receives a DCI format in a first DL sub-frame 930, it uses the corresponding first CCE to determine $n_{PUCCH}(0)$ 940 for the HARQ-ACK signal transmission from the second antenna having {NACK/DTX, ACK} 952, {ACK, ACK} 954, and {NACK/DTX, NACK} 956 as the possible HARQ-ACK states in the QPSK constellation. If the UE receives a DCI format only in the first DL sub-fame 904, it uses the corresponding first CCE to determine the $n_{PUCCH}(0)$ 960 for the HARQ-ACK signal transmission having {ACK, NACK/DTX} 972, and {NACK, DTX} 974 as the possible HARQ-ACK states in the QPSK constellation by either using 1 UE transmitter antenna or by combining the transmission from multiple UE antennas (using precoding, for example).

Therefore, CCEs corresponding to multiple DCI formats, in respectively multiple DL sub-frames in a TDD system, or multiple DL cells in an FDD system, are used to support ORTD if the DCI format associated with the PUCCH resource for conventional HARQ-ACK signal transmission cannot be assumed to have been transmitted with more than one CCE.

A process for the Node B receiver to determine the PUCCH resources used by the UE for the HARQ-ACK signal transmission with ORTD is to perform energy detection at the candidate PUCCH resources. Once the Node B determines PUCCH resources with HARQ-ACK signal transmission, it can then process the received signal according to the constellation points in FIG. 9. In the case of 2 UE transmitter antennas, the respective signals can be combined according to a known method, such as Maximal-Ratio Combining (MRC).

Figure 10:
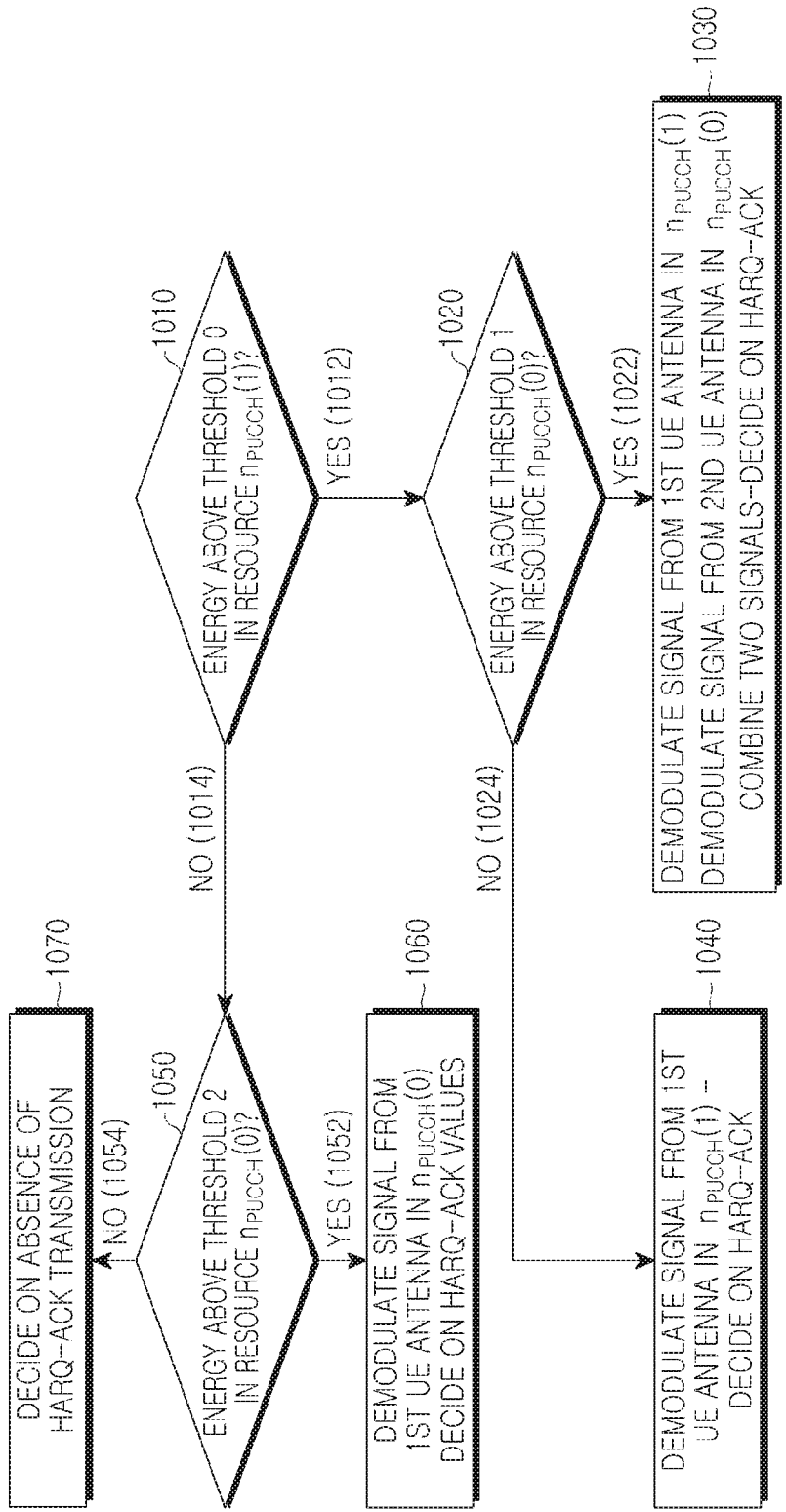
FIG. 10 is a diagram illustrating the processing steps of the Node B receiver's reception of a HARQ-ACK signal using multiplexing with ORTD.

FIG. 10 illustrates the Node B receiver processing steps for the reception of a HARQ-ACK signal using multiplexing with ORTD. The Node B receiver first examines 1010 whether the received signal energy in $n_{PUCCH}(1)$ is above "Threshold 0." If it is 1012, the Node B receiver also examines 1020 whether the signal energy in $n_{PUCCH}(0)$ is above "Threshold 1." If it is 1022, the Node B receiver assumes the existence of HARQ-ACK signals in $n_{PUCCH}(0)$ and $n_{PUCCH}(1)$ due to ORTD, proceeds with demodulating the HARQ-ACK signals transmitted from the 2 UE antennas, and combines the outputs according to some method such as MRC 1030. If it is not 1024, the Node B receiver assumes the existence of a HARQ-ACK signal only in $n_{PUCCH}(1)$ and proceeds with its demodulation 1040. If the received signal energy in $n_{PUCCH}(1)$ is not above "Threshold 0" 1014, the Node B receiver examines whether the signal energy in $n_{PUCCH}(0)$ is above "Threshold 2" 1050. This step may be the same as the one in step 1030, possibly with different values for "Threshold 1" and "Threshold 2." If it is 1052, the Node B receiver demodulates the HARQ-ACK signal and makes a decision for the corresponding values 1060. If it is not 1054, the Node B may not perform any further action and may assume that the UE did not correctly receive any DCI format in the M=2 DL sub-frames 1070. It is observed that no additional steps are required by the Node B receiver to support ORTD with this method as the capability to compute the received signal energy in $n_{PUCCH}(0)$ and $n_{PUCCH}(1)$ and compare it to the respective thresholds is already required to support HARQ-ACK multiplexing using PUCCH resource selection.

Although the embodiment in FIG. 9 considers that ORTD may not apply if the UE receives a DCI format only in the first DL sub-frame, an alternative embodiment is to allow for ORTD to apply if the UE receives a DCI format only in the first DL sub-frame by allowing the UE to assume that the DCI format in the first DL sub-frame includes at least 2 CCEs. No such requirement is needed for the DCI formats transmitted to the UE in the remaining DL sub-frames for which the HARQ-ACK signal transmission is in the same UL sub-frame, and ORTD can apply as described in conjunction with FIG. 9.

Another embodiment of the present invention considers iterative mapping rules, as the number of DL sub-frames (TDD system) for which the HARQ-ACK signal transmissions need to be in the same UL sub-frame increases, in order to minimize the number of overlapping HARQ-ACK states. The iterative mapping rules for the HARQ-ACK states corresponding to M DL sub-frames having the HARQ-ACK signal transmission in the same UL sub-frame are:

A HARQ-ACK state with M values (for M DL sub-frames) having arbitrary M−1 first values and NACK/DTX or DTX as its last (M-th) value is mapped to the same PUCCH resource and QPSK constellation point as the HARQ-ACK state with the same M−1 values (for M−1 DL sub-frames).

The HARQ-ACK state with M ACK values is mapped to $n_{PUCCH}(M-1)$ and always to the same QPSK constellation point.

If all first M−1 HARQ-ACK values include DTX, the M-th HARQ-ACK value is mapped to $n_{PUCCH}(M-1)$ an if it is ACK. The same may apply in the case of a NACK.

If all first M−1 HARQ-ACK values include DTX and the M-th HARQ-ACK value is a NACK, the HARQ-ACK state may be mapped to the same $n_{PUCCH}(M-k)$, $1<k\leq M$ and QPSK constellation point as a HARQ-ACK state with M−1 values where all M−1 values are combinations of DTX and NACK (for example, entry 8 in Table 7). This provides an additional $n_{PUCCH}(M-1)$ resource for mapping a HARQ-ACK state having ACK as its last value.

The remaining HARQ-ACK states, which always have an ACK value as their last value, are either mapped on a $n_{PUCCH}(M-k)$, $1<k\leq M$, if any respective QPSK constellation points are available (Table 6), or they are mapped on $n_{PUCCH}(M-1)$ with priority to available QPSK constellation points (Table 7). Because there are more remaining HARQ-ACK states than available resources, some HARQ-ACK states are inevitably mapped to the same resource. The objective in this case is to minimize the number of unnecessary retransmissions. All HARQ-ACK states with M values having an ACK value as the last value may be mapped on $n_{PUCCH}(M-1)$ (Table 8).

TABLE 6

HARQ-ACK Multiplexing for 4 Node B PDSCH Transmissions

| Entry Number | HARQ-ACK(0), HARQ-ACK(1), HARQ-ACK(2), HARQ-ACK(3) | $n_{PUCCH}$ | QPSK |
|---|---|---|---|
| 1 | ACK, ACK, ACK, ACK | $n_{PUCCH}(3)$ | 1, 1 |
| 2 | ACK, ACK, ACK, NACK/DTX | $n_{PUCCH}(2)$ | 1, 1 |
| 3 | NACK/DTX, NACK/DTX, NACK, DTX | $n_{PUCCH}(2)$ | 0, 1 |
| 4 | ACK, ACK, NACK/DTX, ACK | $n_{PUCCH}(1)$ | 0, 1 |
| 5 | NACK, DTX, DTX, DTX | $n_{PUCCH}(0)$ | 1, 0 |
| 6 | ACK, ACK, NACK/DTX, NACK/DTX | $n_{PUCCH}(1)$ | 1, 1 |
| 7 | ACK, NACK/DTX, ACK, ACK | $n_{PUCCH}(3)$ | 0, 1 |
| 8 | NACK/DTX, NACK/DTX, NACK/DTX, NACK | $n_{PUCCH}(3)$ | 0, 0 |
| 9 | ACK, NACK/DTX, ACK, NACK/DTX | $n_{PUCCH}(0)$ | 1, 1 |
| 10 | ACK, NACK/DTX, NACK/DTX, ACK | $n_{PUCCH}(0)$ | 0, 0 |
| 11 | ACK, NACK/DTX, NACK/DTX, NACK/DTX | $n_{PUCCH}(0)$ | 0, 1 |
| 12 | NACK/DTX, ACK, ACK, ACK | $n_{PUCCH}(3)$ | 0, 1 |
| 13 | NACK/DTX, NACK, DTX, DTX | $n_{PUCCH}(1)$ | 1, 0 |
| 14 | NACK/DTX, ACK, ACK, NACK/DTX | $n_{PUCCH}(2)$ | 1, 0 |
| 15 | NACK/DTX, ACK, NACK/DTX, ACK | $n_{PUCCH}(1)$ | 0, 1 |
| 16 | NACK/DTX, ACK, NACK/DTX, NACK/DTX | $n_{PUCCH}(1)$ | 0, 0 |
| 17 | NACK/DTX, NACK/DTX, ACK, ACK | $n_{PUCCH}(3)$ | 0, 1 |
| 18 | NACK/DTX, NACK/DTX, ACK, NACK/DTX | $n_{PUCCH}(2)$ | 0, 0 |
| 19 | NACK/DTX, NACK/DTX, NACK/DTX, ACK | $n_{PUCCH}(3)$ | 1, 0 |
| 20 | DTX, DTX, DTX, DTX | N/A | N/A |

Table 7 illustrates the HARQ-ACK mapping when all available resources are used (PUCCH resources and QPSK constellation points) and only HARQ-ACK states having an ACK value as the last value are mapped to the last PUCCH resource ($n_{PUCCH}(M-1)=n_{PUCCH}(3)$).

TABLE 7

HARQ-ACK Multiplexing for 4 Node B PDSCH Transmissions - Only HARQ-ACK states with HARQ-ACK(3) = ACK are mapped on $n_{PUCCH}(3)$

| Entry Number | HARQ-ACK(0), HARQ-ACK(1), HARQ-ACK(2), HARQ-ACK(3) | $n_{PUCCH}$ | QPSK |
|---|---|---|---|
| 1 | ACK, ACK, ACK, ACK | $n_{PUCCH}(3)$ | 1, 1 |
| 2 | ACK, ACK, ACK, NACK/DTX | $n_{PUCCH}(2)$ | 1, 1 |
| 3 | NACK/DTX, NACK/DTX, NACK, DTX | $n_{PUCCH}(2)$ | 0, 1 |
| 4 | ACK, ACK, NACK/DTX, ACK | $n_{PUCCH}(3)$ | 0, 0 |
| 5 | NACK, DTX, DTX, DTX | $n_{PUCCH}(0)$ | 1, 0 |
| 6 | ACK, ACK, NACK/DTX, NACK/DTX | $n_{PUCCH}(1)$ | 1, 1 |
| 7 | ACK, NACK/DTX, ACK, ACK | $n_{PUCCH}(3)$ | 0, 1 |
| 8 | NACK/DTX, NACK/DTX, NACK/DTX, NACK | $n_{PUCCH}(0)$ | 1, 0 |
| 9 | ACK, NACK/DTX, ACK, NACK/DTX | $n_{PUCCH}(0)$ | 1, 1 |
| 10 | ACK, NACK/DTX, NACK/DTX, ACK | $n_{PUCCH}(0)$ | 0, 0 |
| 11 | ACK, NACK/DTX, NACK/DTX, NACK/DTX | $n_{PUCCH}(0)$ | 0, 1 |
| 12 | NACK/DTX, ACK, ACK, ACK | $n_{PUCCH}(3)$ | 0, 1 |
| 13 | NACK/DTX, NACK, DTX, DTX | $n_{PUCCH}(1)$ | 1, 0 |
| 14 | NACK/DTX, ACK, ACK, NACK/DTX | $n_{PUCCH}(2)$ | 1, 0 |
| 15 | NACK/DTX, ACK, NACK/DTX, ACK | $n_{PUCCH}(1)$ | 0, 1 |
| 16 | NACK/DTX, ACK, NACK/DTX, NACK/DTX | $n_{PUCCH}(1)$ | 0, 0 |
| 17 | NACK/DTX, NACK/DTX, ACK, ACK | $n_{PUCCH}(3)$ | 0, 1 |
| 18 | NACK/DTX, NACK/DTX, ACK, NACK/DTX | $n_{PUCCH}(2)$ | 0, 0 |
| 19 | NACK/DTX, NACK/DTX, NACK/DTX, ACK | $n_{PUCCH}(3)$ | 1, 0 |
| 20 | DTX, DTX, DTX, DTX | N/A | N/A |

Table 8 illustrates the HARQ-ACK mapping when all available resources are used (PUCCH resources and QPSK constellation points) and all HARQ-ACK states having an ACK value as the last value are mapped to the last PUCCH resource ($n_{PUCCH}(M-1)=n_{PUCCH}(3)$). In the example of Table 8, the overlapped HARQ-ACK states are selected so that only the outcome of the third PDSCH transmission is ambiguous. However, all combinations leading to one of the first 3 PDSCH transmissions being ambiguous (regarding whether the PDSCH reception is correct) are possible.

TABLE 8

HARQ-ACK Multiplexing for 4 Node B PDSCH Transmissions - All HARQ-ACK states with HARQ-ACK(3) = ACK are mapped on $n_{PUCCH}(3)$

| Entry Number | HARQ-ACK(0), HARQ-ACK(1), HARQ-ACK(2), HARQ-ACK(3) | $n_{PUCCH}$ | QPSK |
|---|---|---|---|
| 1 | ACK, ACK, ACK, ACK | $n_{PUCCH}(3)$ | 1, 1 |
| 2 | ACK, ACK, ACK, NACK/DTX | $n_{PUCCH}(2)$ | 1, 1 |
| 3 | NACK/DTX, NACK/DTX, NACK, DTX | $n_{PUCCH}(2)$ | 0, 1 |
| 4 | ACK, ACK, NACK/DTX, ACK | $n_{PUCCH}(3)$ | 1, 1 |
| 5 | NACK, DTX, DTX, DTX | $n_{PUCCH}(0)$ | 1, 0 |
| 6 | ACK, ACK, NACK/DTX, NACK/DTX | $n_{PUCCH}(1)$ | 1, 1 |
| 7 | ACK, NACK/DTX, ACK, ACK | $n_{PUCCH}(3)$ | 0, 1 |
| 8 | NACK/DTX, NACK/DTX, NACK/DTX, NACK | $n_{PUCCH}(0)$ | 1, 0 |
| 9 | ACK, NACK/DTX, ACK, NACK/DTX | $n_{PUCCH}(0)$ | 1, 1 |
| 10 | ACK, NACK/DTX, NACK/DTX, ACK | $n_{PUCCH}(3)$ | 0, 1 |
| 11 | ACK, NACK/DTX, NACK/DTX, NACK/DTX | $n_{PUCCH}(0)$ | 0, 1 |
| 12 | NACK/DTX, ACK, ACK, ACK | $n_{PUCCH}(3)$ | 0, 0 |
| 13 | NACK/DTX, NACK, DTX, DTX | $n_{PUCCH}(1)$ | 1, 0 |
| 14 | NACK/DTX, ACK, ACK, NACK/DTX | $n_{PUCCH}(2)$ | 1, 0 |
| 15 | NACK/DTX, ACK, NACK/DTX, ACK | $n_{PUCCH}(3)$ | 0, 0 |
| 16 | NACK/DTX, ACK, NACK/DTX, NACK/DTX | $n_{PUCCH}(1)$ | 0, 0 |
| 17 | NACK/DTX, NACK/DTX, ACK, ACK | $n_{PUCCH}(3)$ | 1, 0 |
| 18 | NACK/DTX, NACK/DTX, ACK, NACK/DTX | $n_{PUCCH}(2)$ | 0, 0 |
| 19 | NACK/DTX, NACK/DTX, NACK/DTX, ACK | $n_{PUCCH}(3)$ | 1, 0 |
| 20 | DTX, DTX, DTX, DTX | N/A | N/A |

Another embodiment of the present invention considers the reduction (including complete avoidance) of the number of HARQ-ACK states mapped to the same PUCCH resource and the same QPSK constellation point (overlapping HARQ-ACK states). To accomplish this objective, the invention considers that the UE can assume that the DCI format corresponding to the PUCCH resource having overlapping HARQ-ACK states consists of at least 2 CCEs (or, in general, of a number of CCEs that is at least equal to the number of overlapping HARQ-ACK states). In the following embodiment, the PUCCH resource notation is extended to also include the CCE index n of the respective DCI format and it can be denoted as $n_{PUCCH}(j,n)^9$ with n=0, . . . , N(j)−1, where N(j) is the total number of CCEs for DCI format j, with j=0, . . . , M−1.

The embodiment considers that HARQ-ACK signal transmission in a single UL sub-frame corresponds to PDSCH transmissions in M=4 DL sub-frames (TDD system). Further, it is assumed by the mapping in Table 8 that the last (fourth) DCI format consists of at least 2 CCEs. Table 9 illustrates the transmission of the (overlapping in Table 8) HARQ-ACK states when the DCI format for the PDSCH transmission in the last (fourth) DL sub-frame is assumed to consist of N(3)=2 CCEs. As can be seen, overlapping of HARQ-ACK states is avoided by separating the transmission of the first and second overlapping HARQ-ACK states in Table 8 using $n_{PUCCH}(3,0)$ and $n_{PUCCH}(3,1)$, respectively. The Node B receiver may determine the HARQ-ACK state transmitted by the UE by examining the received signal energy at the candidate PUCCH resources as previously described.

TABLE 9

Transmission of Different HARQ-ACK for Overlapping Avoidance.

| Entry Number | PUCCH resource $n_{PUCCH}(3, 0)$ HARQ-ACK(0), HARQ-ACK(1), HARQ-ACK(2), HARQ-ACK(3) | PUCCH resource $n_{PUCCH}(3, 1)$ HARQ-ACK(0), HARQ-ACK(1), HARQ-ACK(2), HARQ-ACK(3) | PSK |
|---|---|---|---|
| 1 | ACK, ACK, ACK, ACK | ACK, ACK, NACK/DTX, ACK | 1, 1 |
| 2 | ACK, NACK/DTX, ACK, ACK | ACK, NACK/DTX, NACK/DTX, ACK | 0, 1 |
| 3 | NACK/DTX, ACK, ACK, ACK | NACK/DTX, ACK, NACK/DTX, ACK | 0, 0 |
| 4 | NACK/DTX, NACK/DTX, ACK, ACK | NACK/DTX, NACK/DTX, NACK/DTX, ACK | 1, 0 |

In the case of multiple UE transmitter antennas, TxD may selectively apply depending on whether overlapping HARQ-ACK states exist at the corresponding PUCCH resource. For example, since all overlapping HARQ-ACK states in Table 8 occur in the PUCCH resource associated with the last DCI format, ORTD may apply if the HARQ-ACK signal transmission is in any PUCCH resource associated with the first 3 DCI formats. Conversely, if the HARQ-ACK signal transmission is in a PUCCH resource associated with the last (fourth) DCI format, both UE antennas transmit in the same PUCCH resource determined by the HARQ-ACK state, as described, for example, in Table 9, in order to avoid the existence of overlapping HARQ-ACK states. Nevertheless, TxD may still apply in case the HARQ-ACK signal transmission is in a PUCCH resource associated with the last (fourth) DCI format by having one transmitter antenna transmit in the resource selected, as in Table 9, and have the second antenna transmit in a PUCCH resource associated with a DCI format in a different DL sub-frame (or DL cell in the case of FDD).

Figure 1:
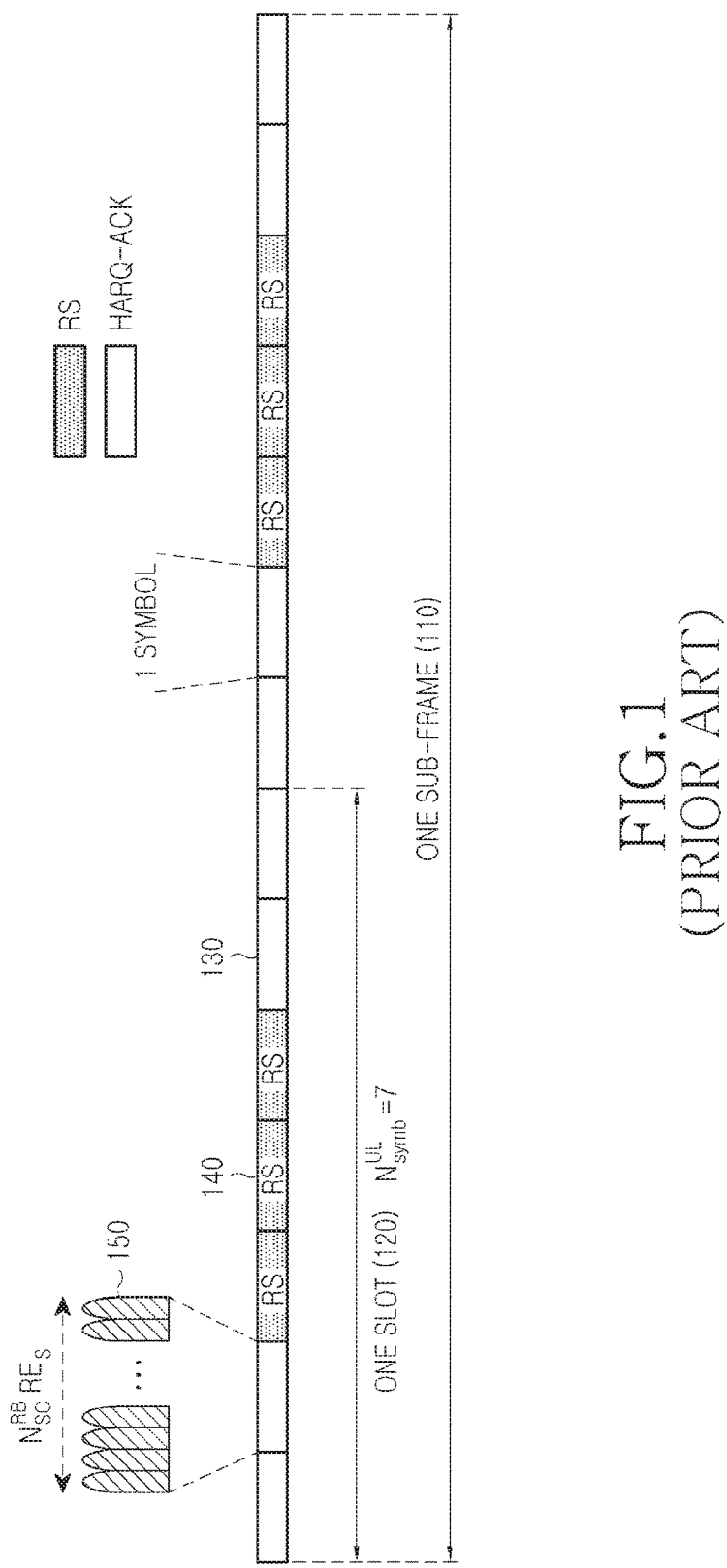
FIG. 1 is a diagram illustrating a PUCCH sub-frame structure for HARQ-ACK signal transmission.
Figure 2:
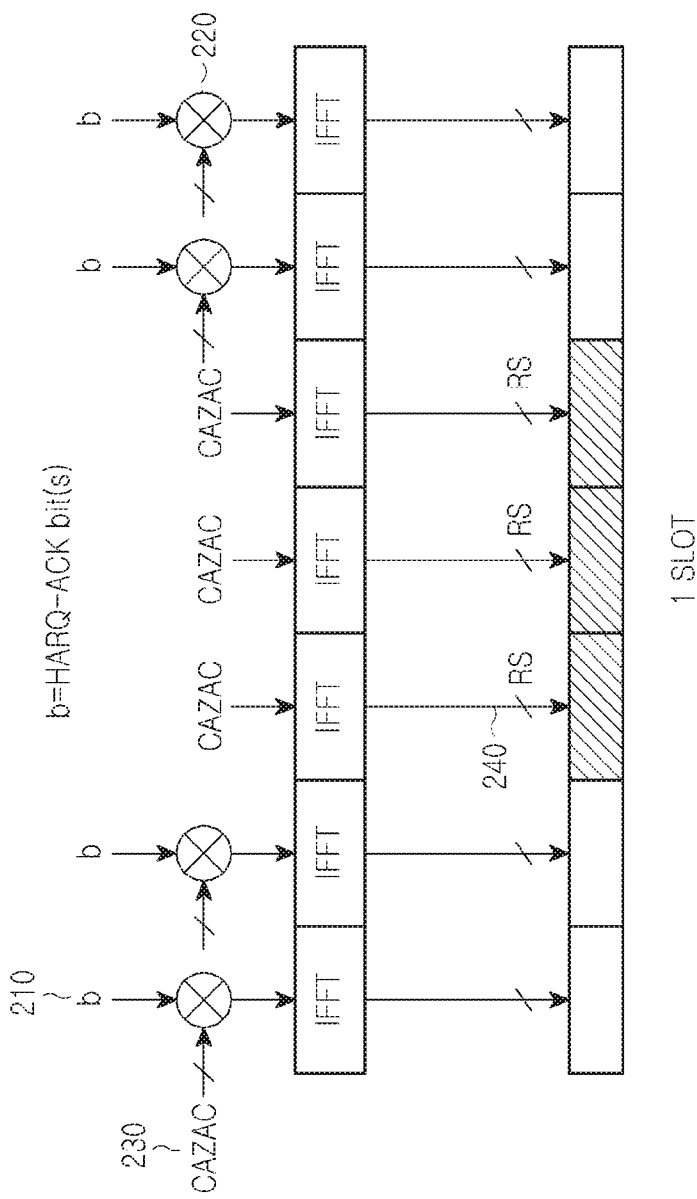
FIG. 2 is a diagram illustrating a HARQ-ACK signal transmission in one slot of the PUCCH sub-frame.
Figure 3:
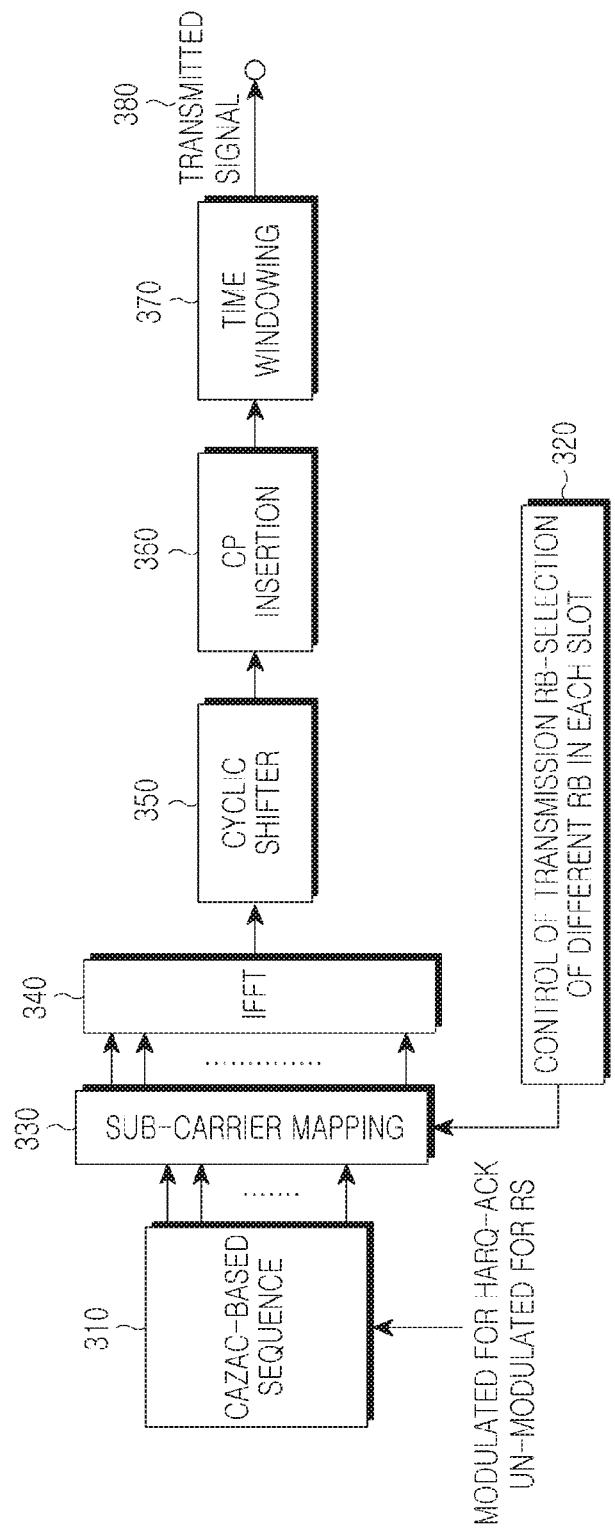
FIG. 3 is a block diagram illustrating a UE transmitter structure for the HARQ-ACK signal in the PUCCH.
Figure 4:
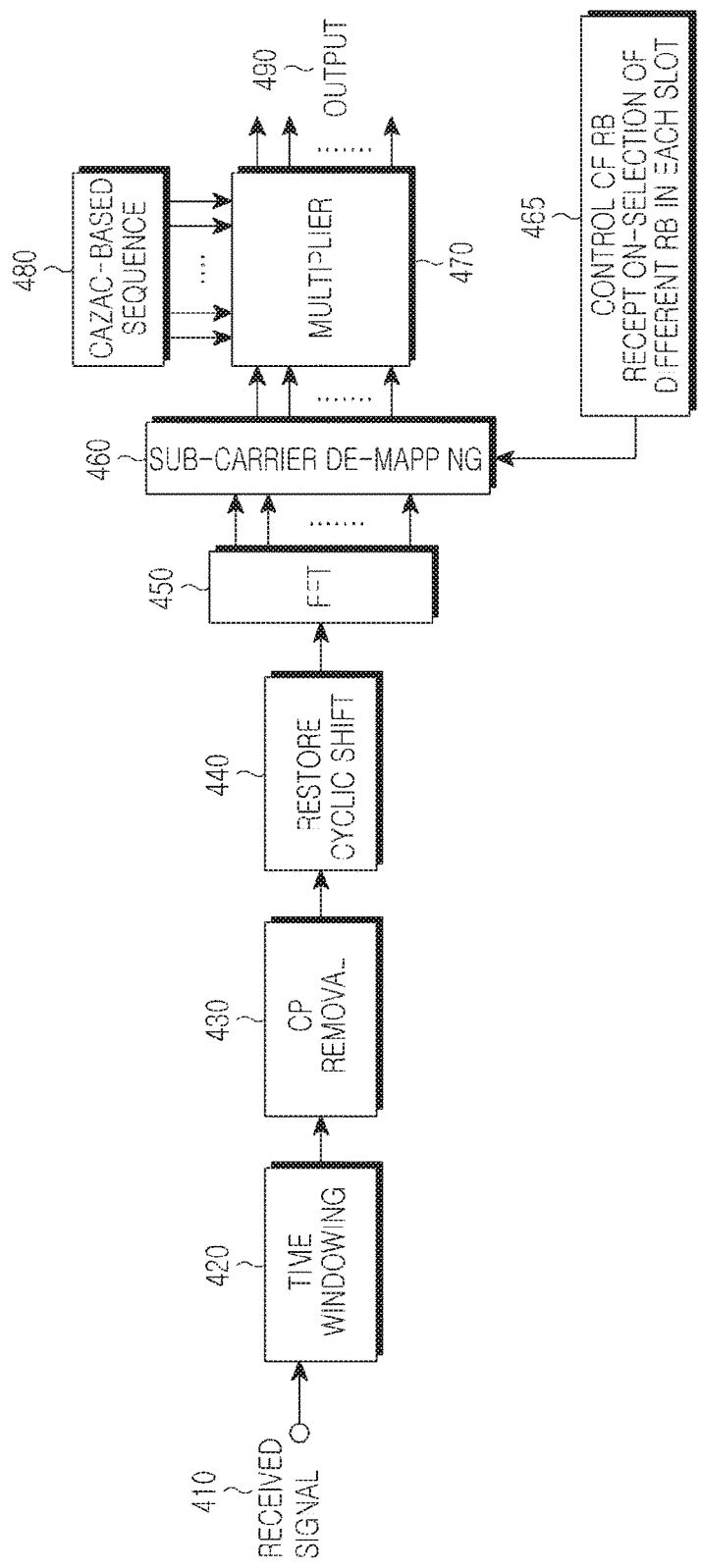
FIG. 4 is a block diagram illustrating a Node B receiver structure for the HARQ-ACK signal in the PUCCH.
Figure 5:
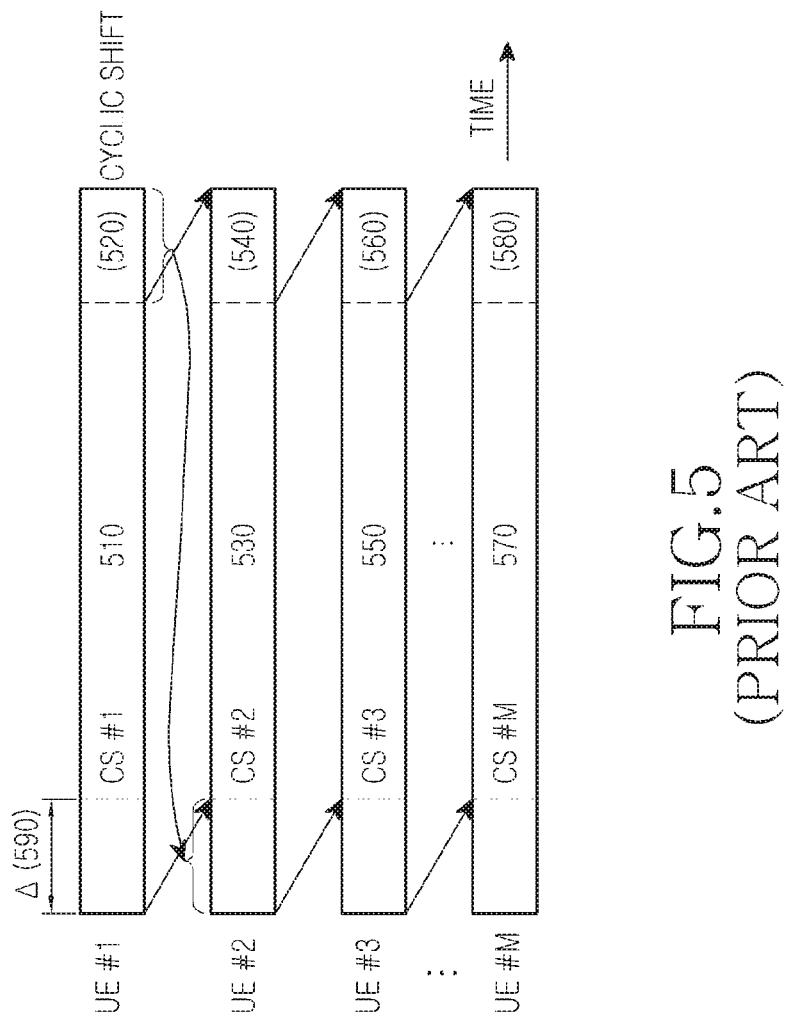
FIG. 5 is a diagram illustrating the use of different CSs of the same CAZAC sequence provide orthogonal CAZAC sequences.
Figure 6:
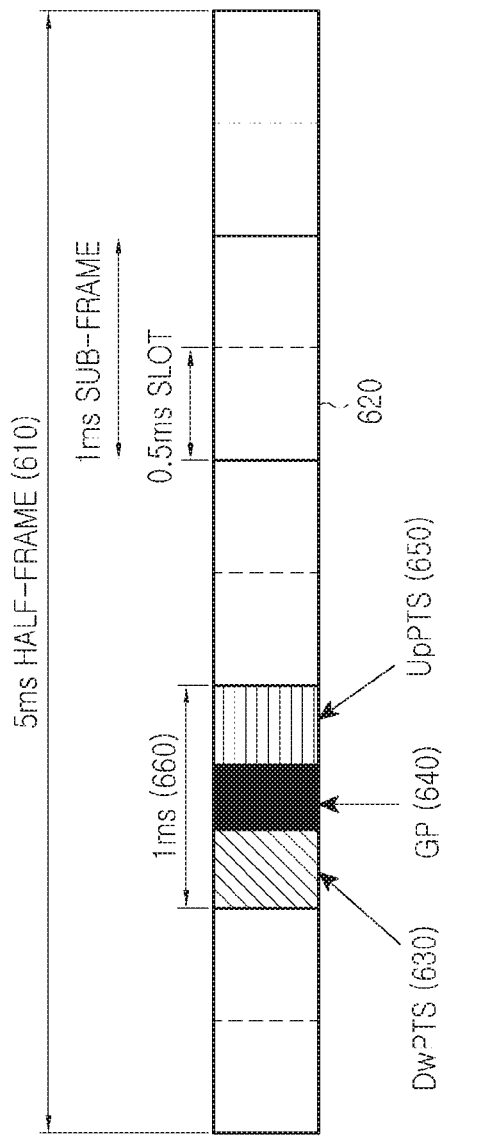
FIG. 6 is a diagram illustrating a 10 ms frame structure which consists of two identical half-frames.
Figure 7:
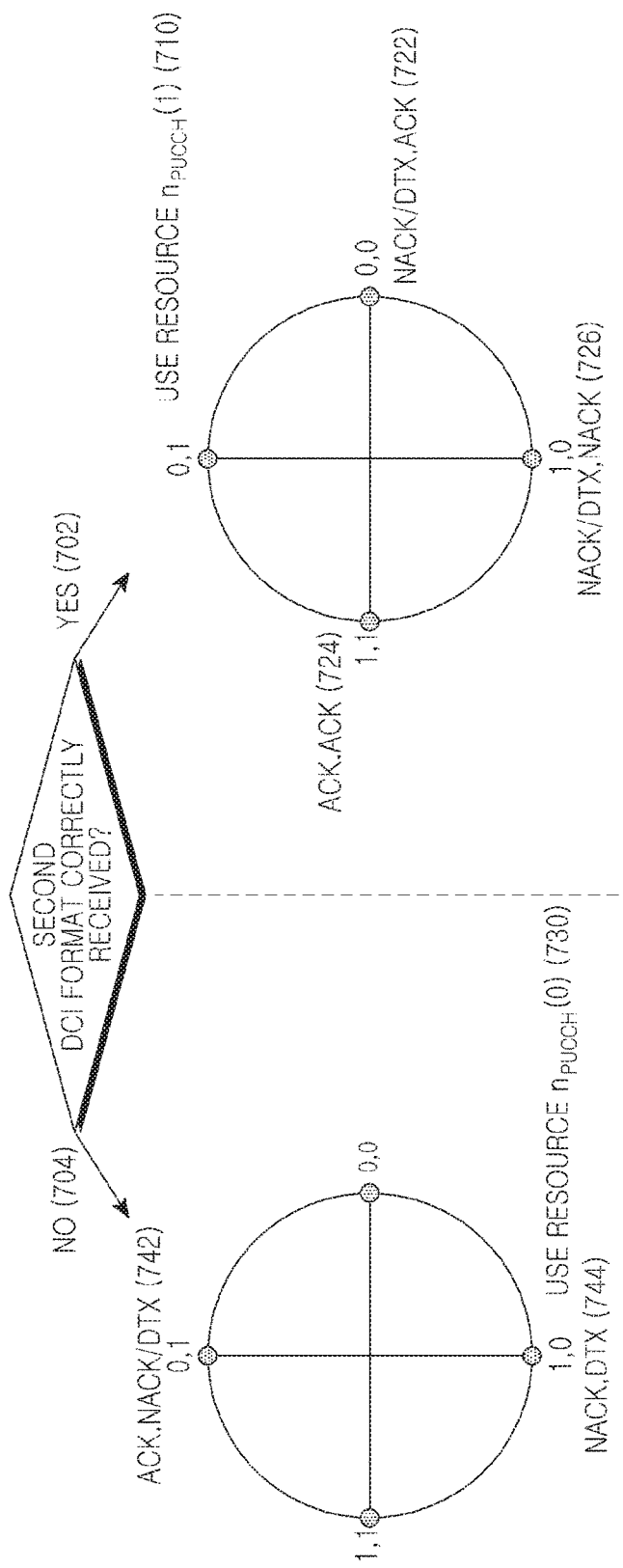
FIG. 7 is a diagram illustrating the HARQ-ACK signal transmission using HARQ-ACK multiplexing in response to PDSCH reception in two DL sub-frames of a TDD system.
Figure 8:
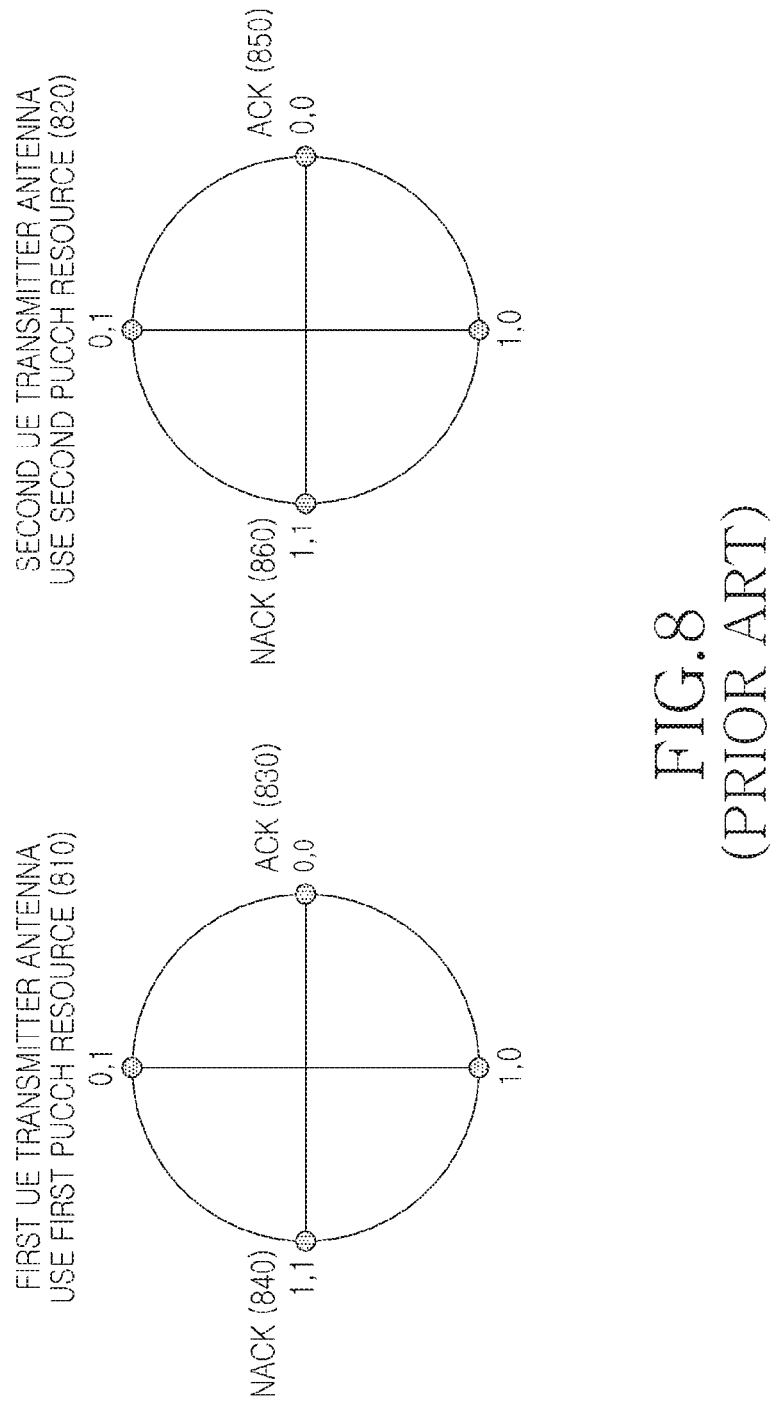
FIG. 8 is a diagram illustrating the application of ORTD.
Figure 11:
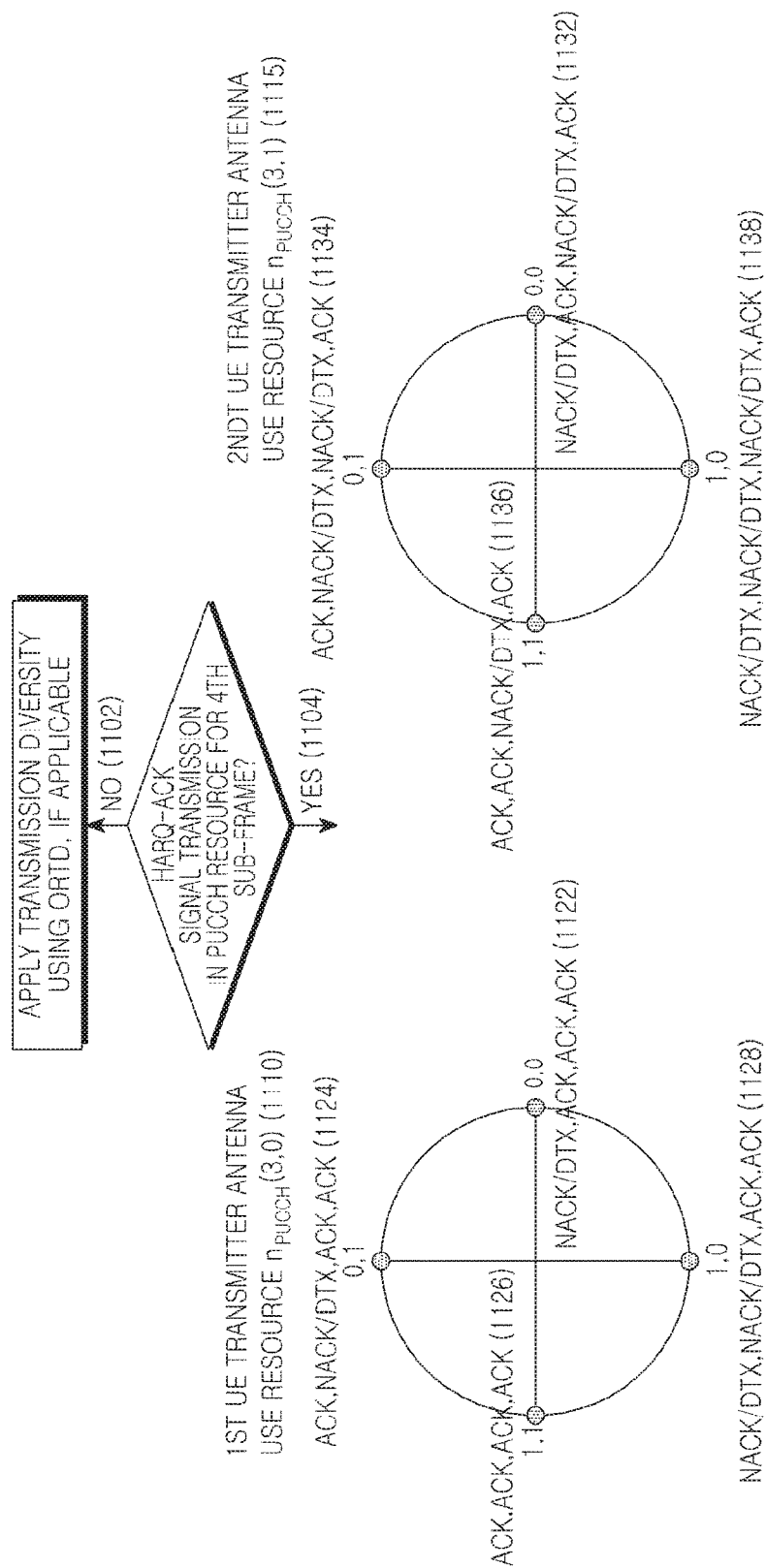
FIG. 11 is a diagram illustrating the application of ORTD in case the DCI format scheduling PDSCH transmission in the last DL sub-frame can be assumed to be transmitted using 2 CCEs.

FIG. 11 illustrates the application of ORTD for 2 UE transmitter antennas when the HARQ-ACK signal transmission is in a single UL sub-frame for M=4 DL sub-frames and the DCI format scheduling PDSCH transmission in the DL last sub-frame can be assumed to be transmitted using 2 CCEs. If the UE receives a DCI format in the last (fourth) sub-frame, that DCI format is assumed to include at least 2 CCEs. If the HARQ-ACK signal transmission is in PUCCH resources associated with a DCI format in any of the first 3 DL sub-frames 1102, TxD applies (either with conventional ORTD as in FIG. 8 or with the ORTD method described by the first object of the invention in FIG. 9). If the HARQ-ACK signal transmission is in PUCCH resources associated with a DCI format in the last (fourth) DL sub-frame 1104, then both UE transmitter antennas 1110 transmit in the same PUCCH resource. In $n_{PUCCH}(3,0)$, the mapping of HARQ-ACK states to QPSK constellation points is: {NACK/DTX, ACK, ACK, ACK}→{0, 0} 1122, {ACK, NACK/DTX, ACK, ACK}→{0, 1} 1124, {ACK, ACK, ACK, ACK}→{1, 1} 1126, and {NACK/DTX, NACK/DTX, ACK, ACK}→{1, 0} 1128. In $n_{PUCCH}(3,1)$, the mapping of HARQ-ACK states to QPSK constellation points is: {NACK/DTX, ACK, NACK/DTX, ACK}→{0, 0} 1132, {ACK, NACK/DTX, NACK/DTX, ACK}→{0, 1} 1134, {ACK, ACK, NACK/DTX, ACK}→{1, 1} 1136, and {NACK/DTX, NACK/DTX, NACK/DTX, ACK}→{1, 0} 1138.

Another embodiment of the invention considers the mapping of HARQ-ACK states to support HARQ-ACK multiplexing with carrier aggregation in FDD in the case of 2 DL cells. If the PDSCH Transmission Mode (TM) in each cell requires the UE to convey 2 HARQ-ACK states for each PDSCH reception for a total of 4 HARQ-ACK states, the DCI format scheduling PDSCH reception with 2 TBs is assumed to require at least 2 CCEs for its transmission with the first 2 CCEs providing 2 PUCCH resources for the mapping of HARQ-ACK states for the HARQ-ACK signal transmission. Therefore, the DCI format in the first cell is associated with PUCCH resources $n_{PUCCH}(0)$ and $n_{PUCCH}(1)$ while the DCI format in the second cell is associated with PUCCH resources $n_{PUCCH}(2)$ and $n_{PUCCH}(3)$. Another consequence of always assuming at least 2 CCEs to transmit the DCI format scheduling PDSCH reception with 2 TBs is that, in the case of a single cell, it is always possible to support TxD using the 2 different PUCCH resources corresponding to the first 2 CCEs of the DCI format.

In general, several HARQ-ACK states used for HARQ-ACK multiplexing in TDD, as for example in Table 4 or Table 7, are not applicable for FDD (in the case of 2 cells and a TM for the PDSCH conveying 2 TBs) as DTX is applicable either to both of the first 2 or last 2 entries or none of them. This reduces the number of overlapping HARQ-ACK states and eliminates entries 3 and 5 of Table 4 or Table 7. Then, by combining entries 8 and 13 in Table 4 or Table 7 into entry 13, the mapping in Table 7 is modified, as in Table 10. It is observed that the only overlap is for entry 10 where DTX for one PDSCH is combined with {NACK, NACK} for the other PDSCH. Then, the only penalty is that one of the HARQ retransmissions is with the incorrect redundancy version. Such an event has little to no impact on system throughput. Moreover, there is no overlapping if DTX feedback is not supported. Therefore, HARQ-ACK multiplexing with 4 bits in the case of CA with 2 DL cells can practically avoid all shortcomings of the one for TDD in Rel-8 (Table 4). A candidate respective mapping is presented in Table 10.

TABLE 10

Mapping for HARQ-ACK Multiplexing with 4 States for FDD CA with 2 DL Cells.

| Entry Number | HARQ-ACK(0), HARQ-ACK(1), HARQ-ACK(2), HARQ-ACK(3) | $n_{PUCCH}$ | QPSK |
|---|---|---|---|
| 1 | ACK, ACK, ACK, ACK | $n_{PUCCH}(3)$ | 1, 1 |
| 2 | ACK, ACK, ACK, NACK | $n_{PUCCH}(2)$ | 1, 1 |
| 3 | ACK, ACK, NACK, ACK | $n_{PUCCH}(3)$ | 0, 0 |
| 4 | ACK, ACK, NACK/DTX, NACK/DTX | $n_{PUCCH}(1)$ | 1, 1 |
| 5 | ACK, NACK, ACK, ACK | $n_{PUCCH}(3)$ | 0, 1 |
| 6 | ACK, NACK, ACK, NACK | $n_{PUCCH}(0)$ | 1, 1 |
| 7 | ACK, NACK, NACK, ACK | $n_{PUCCH}(0)$ | 0, 0 |
| 8 | ACK, NACK, NACK/DTX, NACK/DTX | $n_{PUCCH}(0)$ | 0, 1 |
| 9 | NACK, ACK, ACK, ACK | $n_{PUCCH}(2)$ | 0, 1 |
| 10 | NACK/DTX, NACK/DTX, NACK/DTX, NACK/DTX | $n_{PUCCH}(1)$ | 1, 0 |
| 11 | NACK, ACK, ACK, NACK | $n_{PUCCH}(2)$ | 1, 0 |
| 12 | NACK, ACK, NACK, ACK | $n_{PUCCH}(1)$ | 0, 1 |
| 13 | NACK, ACK, NACK/DTX, NACK/DTX | $n_{PUCCH}(1)$ | 0, 0 |
| 14 | NACK/DTX, NACK/DTX, ACK, ACK | $n_{PUCCH}(0)$ | 1, 0 |
| 15 | NACK/DTX, NACK/DTX, ACK, NACK | $n_{PUCCH}(2)$ | 0, 0 |
| 16 | NACK/DTX, NACK/DTX, NACK, ACK | $n_{PUCCH}(3)$ | 1, 0 |
| 17 | DTX, DTX, DTX, DTX | N/A | N/A |

When the TM of the PDSCH in the first cell requires feedback from the UE of 2 HARQ-ACK states (for 2 TBs) and the TM of the PDSCH in the second cell requires feedback from the UE of 1 HARQ-ACK state (for 1 TB), the respective mapping for HARQ-ACK multiplexing with 3 states can be as in Table 11.A. The DTX state for the PDSCH in the second cell is explicitly indicated and mapped to PUCCH resource $n_{PUCCH}(0)$ or $n_{PUCCH}(1)$, both of which are associated with the DCI format transmission scheduling PDSCH reception in the first cell. The NACK state for the PDSCH in the second cell can be mapped to any PUCCH resource, such as, for example, $n_{PUCCH}(2)$, which is associated with the DCI format transmission scheduling PDSCH reception in the second cell. The ACK state for the PDSCH in the second cell can also be mapped to any resource, such as, for example, $n_{PUCCH}(1)$. The exact QPSK constellation point is not relevant to the proposed mapping.

TABLE 11.A

Mapping for HARQ-ACK Multiplexing with 3 States. First 2 States Correspond to Same PDSCH.

| Entry Number | HARQ-ACK(0), HARQ-ACK(1), HARQ-ACK(2) | $n_{PUCCH}$ | QPSK |
|---|---|---|---|
| 1 | ACK, ACK, NACK | $n_{PUCCH}(2)$ | 0, 0 |
| 2 | ACK, NACK, NACK | $n_{PUCCH}(2)$ | 0, 1 |
| 3 | NACK, ACK, NACK | $n_{PUCCH}(2)$ | 1, 0 |
| 4 | NACK, NACK, NACK | $n_{PUCCH}(2)$ | 1, 1 |
| 5 | ACK, ACK, ACK | $n_{PUCCH}(1)$ | 0, 0 |
| 6 | NACK, ACK, ACK | $n_{PUCCH}(1)$ | 0, 1 |
| 7 | ACK, NACK, ACK | $n_{PUCCH}(1)$ | 1, 0 |
| 8 | NACK, NACK, ACK | $n_{PUCCH}(1)$ | 1, 1 |
| 9 | ACK, ACK, DTX | $n_{PUCCH}(0)$ | 0, 0 |
| 10 | ACK, NACK, DTX | $n_{PUCCH}(0)$ | 0, 1 |
| 11 | NACK, ACK, DTX | $n_{PUCCH}(0)$ | 1, 0 |
| 12 | NACK, NACK, DTX | $n_{PUCCH}(0)$ | 1, 1 |
| 13 | DTX, DTX, DTX | N/A | N/A |

The same principles apply in the case in which the TM of the PDSCH in the second cell requires feedback from the UE of 2 HARQ-ACK states (for 2 TBs) and the TM of the PDSCH in the first cell requires feedback from the UE of 1 HARQ-ACK state (for 1 TB). The respective mapping for HARQ-ACK multiplexing with 3 states is then obtained by simply switching the first and third HARQ-ACK states in Table 11.A as shown in Table 11.B.

TABLE 11.B

Mapping for HARQ-ACK Multiplexing with 3 States. Last 2 States Correspond to Same PDSCH.

| Entry Number | HARQ-ACK(0), HARQ-ACK(1), HARQ-ACK(2) | $n_{PUCCH}$ | QPSK |
|---|---|---|---|
| 1 | NACK, ACK, ACK | $n_{PUCCH}(2)$ | 0, 0 |
| 2 | NACK, NACK, ACK | $n_{PUCCH}(2)$ | 0, 1 |
| 3 | NACK, ACK, NACK | $n_{PUCCH}(2)$ | 1, 0 |
| 4 | NACK, NACK, NACK | $n_{PUCCH}(2)$ | 1, 1 |
| 5 | ACK, ACK, ACK | $n_{PUCCH}(1)$ | 0, 0 |
| 6 | ACK, ACK, NACK | $n_{PUCCH}(1)$ | 0, 1 |
| 7 | ACK, NACK, ACK | $n_{PUCCH}(1)$ | 1, 0 |
| 8 | ACK, NACK, NACK | $n_{PUCCH}(1)$ | 1, 1 |
| 9 | DTX, ACK, ACK | $n_{PUCCH}(0)$ | 0, 0 |
| 10 | DTX, ACK, NACK | $n_{PUCCH}(0)$ | 0, 1 |
| 11 | DTX, NACK, ACK | $n_{PUCCH}(0)$ | 1, 0 |
| 12 | DTX, NACK, NACK | $n_{PUCCH}(0)$ | 1, 1 |
| 13 | DTX, DTX, DTX | N/A | N/A |

In the case in which the TM of the PDSCH in either of the 2 cells requires feedback from the UE of 1 HARQ-ACK state (for 1 TB), the respective mapping for HARQ-ACK multiplexing with 2 states can be as in Table 12. The DTX state for either cell is explicitly mapped. PUCCH resource $n_{PUCCH}(1)$, corresponding to the first CCE of the DCI format scheduling the PDSCH reception in the second cell, is used to map the DTX state for the first cell while PUCCH resource $n_{PUCCH}(0)$, corresponding to the first CCE of the DCI format scheduling the PDSCH reception in the first cell, is used to map the DTX state for the second cell. The NACK or ACK state can be mapped to any PUCCH resource. The exact point of the QPSK constellation is, again, not relevant to the proposed mapping.

TABLE 12

Mapping for HARQ-ACK Multiplexing with 2 States for FDD CA with 2 Cells.

| HARQ-ACK(0), HARQ-ACK(1) | $n_{PUCCH}$ | QPSK |
|---|---|---|
| ACK, NACK | $n_{PUCCH}(1)$ | 0, 0 |
| NACK, NACK | $n_{PUCCH}(1)$ | 0, 1 |
| DTX, NACK | $n_{PUCCH}(1)$ | 1, 0 |
| DTX, ACK | $n_{PUCCH}(1)$ | 1, 1 |
| ACK, ACK | $n_{PUCCH}(0)$ | 0, 0 |
| NACK, ACK | $n_{PUCCH}(0)$ | 0, 1 |
| ACK, DTX | $n_{PUCCH}(0)$ | 1, 0 |
| NACK, DTX | $n_{PUCCH}(0)$ | 1, 1 |
| DTX, DTX | N/A | N/A |

Figure 12:
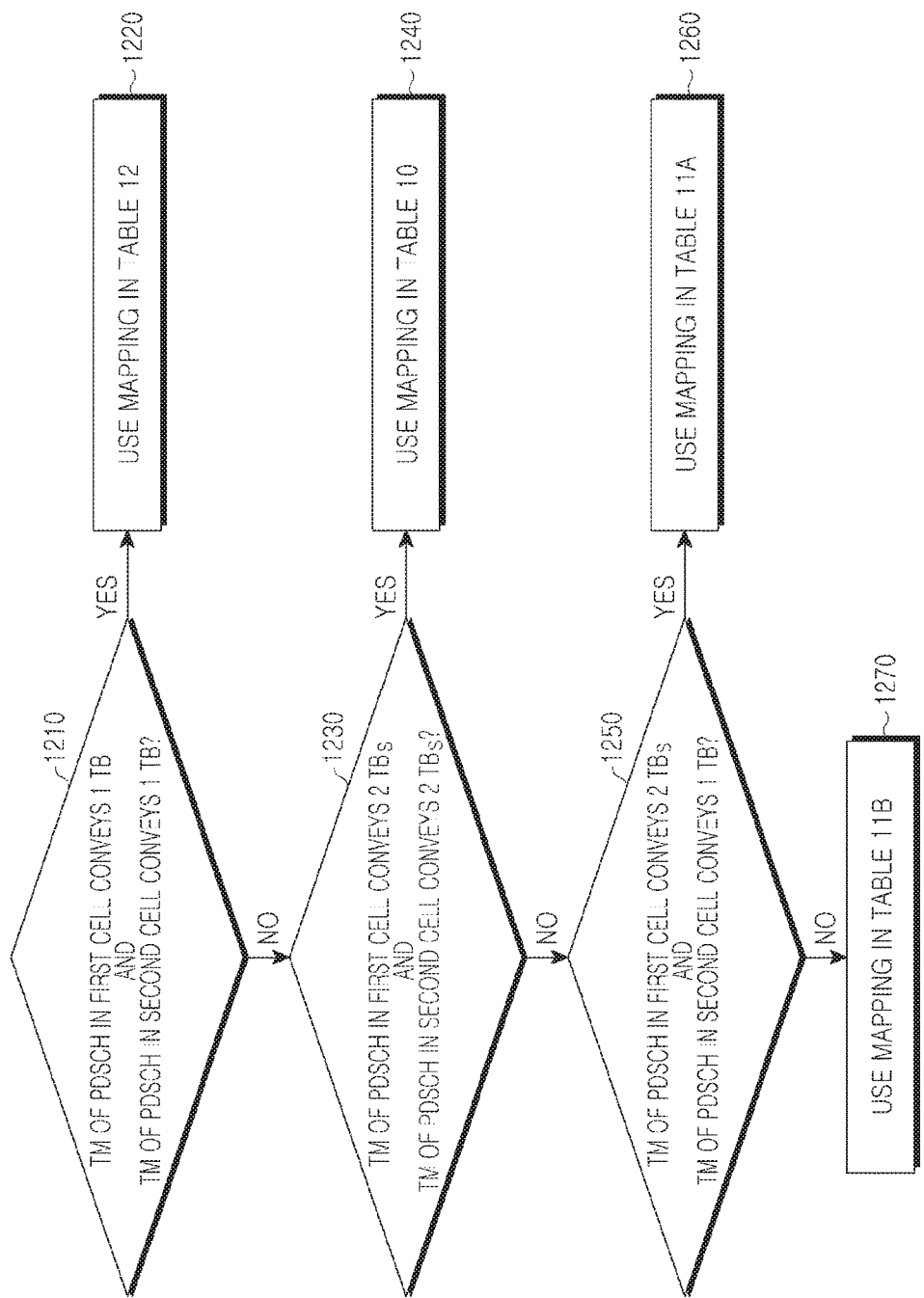
FIG. 12 is a diagram illustrating the UE operation for HARQ-ACK signal transmission with multiplexing in an FDD system where the UE receives PDSCH in two DL cells.

The UE operation for HARQ-ACK signal transmission with multiplexing in an FDD system where the UE receives PDSCH in two DL cells is described in FIG. 12. If the TM for the PDSCH in first cell conveys 1 TB and the TM for the PDSCH in the second cell conveys 1 TB 1210, then the UE uses the mapping of HARQ-ACK states in Table 12 1220. Otherwise, if the TM for the PDSCH in first cell conveys 2 TBs and the TM for the PDSCH in the second cell conveys 2 TBs 1230, then the UE uses the mapping of HARQ-ACK states in Table 10 1240. Otherwise, if the TM for the PDSCH in first cell conveys 2 TBs and the TM for the PDSCH in the second cell conveys 1 TB 1250, then the UE uses the mapping of HARQ-ACK states in Table 11.A 1260. Otherwise, the UE uses the mapping of HARQ-ACK states in Table 11.B 1270.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for transmitting a hybrid automatic repeat request-acknowledgement (HARQ-ACK) signal in a communication system, the method comprising:
   identifying transmission modes of a first cell and a second cell in frequency division duplex (FDD);
   receiving one or more transport blocks by at least one of a physical downlink shared channel (PDSCH) transmission on the first cell or a PDSCH transmission on the second cell;
   determining a physical uplink control channel (PUCCH) resource; and
   transmitting the HARQ-ACK signal for the one or more transport blocks on the PUCCH resource,
   wherein the PUCCH resource is selected from a plurality of PUCCH resources, the plurality of PUCCH resources are associated with the transmission modes of the first cell and the second cell,
   wherein at least one of the plurality of PUCCH resources for at least one of the PDSCH transmissions is determined based on at least one of physical downlink control channels (PDCCHs) corresponding to the at least one of the PDSCH transmissions, respectively, and
   wherein the HARQ-ACK signal transmitted on the selected PUCCH resource denotes at least one of acknowledgement (ACK), negative acknowledgement (NACK), or discontinuous transmission (DTX) response for each of the one or more transport blocks.

2. The method of claim 1, wherein the plurality of PUCCH resources comprise a first PUCCH resource for the PDSCH transmission on the first cell,
   wherein a PDCCH on the first cell comprises at least one control channel element (CCE), and
   wherein the first PUCCH resource for the PDSCH transmission on the first cell is identified based on a first CCE used for transmission of the corresponding PDCCH and based on a value configured by higher layers.

3. The method of claim 2, wherein a transmission mode of the first cell supports up to two transport blocks,
   wherein the plurality of PUCCH resources comprise the first PUCCH resource and a second PUCCH resource for PDSCH transmission on the first cell, and
   wherein the second PUCCH resource for the PDSCH transmission on the first cell is identified based on the first CCE+1.

4. The method of claim 1, wherein the plurality of PUCCH resources comprise a first PUCCH resource and a second PUCCH resource for the PDSCH transmission on the second cell,
   wherein a PDCCH on the second cell comprises downlink control information (DCI), and
   wherein the first PUCCH resource and the second PUCCH resource for the PDSCH transmission on the second cell for a transmission mode of the second cell that supports up to two transport blocks, are determined based on the DCI of the corresponding PDCCH and based on a value configured by higher layers.

5. The method of claim 1, wherein a number of the plurality of PUCCH resources is one of 2, 3 or 4.

6. The method of claim 5, wherein the PUCCH resource is selected according to a format configured based on the ACK, NACK, or DTX response for the each of the one or more transport blocks and based on the number of the plurality of PUCCH resources.

7. The method of claim 1, wherein the HARQ-ACK signal is transmitted by a constellation point on the PUCCH resource.

8. The method of claim 7, wherein the constellation point is mapped to the ACK, NACK, or DTX response for the each of the one or more transport blocks.

9. A method for receiving a hybrid automatic repeat request-acknowledgement (HARQ-ACK) signal in a communication system, the method comprising:
   transmitting one or more transport blocks by at least one of a physical downlink shared channel (PDSCH) transmission on a first cell or a PDSCH transmission on a second cell; and
   receiving the HARQ-ACK signal for the one or more transport blocks on a physical uplink control channel (PUCCH) resource,
   wherein the PUCCH resource is selected from a plurality of PUCCH resources, the plurality of PUCCH resources are associated with transmission modes of the first cell and the second cell,
   wherein at least one of the plurality of PUCCH resources for at least one of the PDSCH transmissions is determined based on at least one of physical downlink control channels (PDCCHs) corresponding to the at least one of the PDSCH transmissions, respectively, and wherein the HARQ-ACK signal received on the selected PUCCH resource denotes at least one of acknowledgement (ACK), negative acknowledgement (NACK), or discontinuous transmission (DTX) response for each of the one or more transport blocks.

10. The method of claim 9, wherein the plurality of PUCCH resources comprise a first PUCCH resource for the PDSCH transmission on the first cell, wherein a PDCCH on the first cell comprises at least one control channel element (CCE), and wherein the first PUCCH resource for the PDSCH transmission on the first cell is identified based on a first CCE used for transmission of the corresponding PDCCH and based on a value configured by higher layers.

11. The method of claim 10, wherein a transmission mode of the first cell supports up to two transport blocks, wherein the plurality of PUCCH resources comprise the first PUCCH resource and a second PUCCH resource for PDSCH transmission on the first cell, and wherein the second PUCCH resource for the PDSCH transmission on the first cell is identified based on the first CCE+1.

12. The method of claim 9, wherein the plurality of PUCCH resources comprise a first PUCCH resource and a second PUCCH resource for the PDSCH transmission on the second cell, wherein a PDCCH on the second cell comprises downlink control information (DCI), and wherein the first PUCCH resource and the second PUCCH resource for the PDSCH transmission on the second cell for a transmission mode of the second cell that supports up to two transport blocks, are determined based on the DCI of the corresponding PDCCH and based on a value configured by higher layers.

13. The method of claim 9, wherein a number of the plurality of PUCCH resources is one of 2, 3 or 4.

14. The method of claim 13, wherein the PUCCH resource is selected according to a format configured based on the ACK, NACK, or DTX response for the each of the one or more transport blocks and based on the number of the plurality of PUCCH resources.

15. The method of claim 9, wherein the HARQ-ACK signal is received by a constellation point on the PUCCH resource.

16. The method of claim 15, wherein the constellation point is mapped to the ACK, NACK, or DTX response for the each of the one or more transport blocks.

17. An apparatus for transmitting a hybrid automatic repeat request-acknowledgement (HARQ-ACK) signal in a communication system, the apparatus comprising:

a processor configured to:
    identify transmission modes of a first cell and a second cell in frequency division duplex (FDD), and
    determine a physical uplink control channel (PUCCH) resource;

a receiver configured to receive one or more transport blocks by at least one of a physical downlink shared channel (PDSCH) transmission on the first cell or a PDSCH transmission on the second cell; and a transmitter configured to transmit the HARQ-ACK signal for the one or more transport blocks on the PUCCH resource, wherein the PUCCH resource is selected from a plurality of PUCCH resources, the plurality of PUCCH resources are associated with the transmission modes of the first cell and the second cell, wherein at least one of the plurality of PUCCH resources for at least one of the PDSCH transmissions is determined based on at least one of physical downlink control channels (PDCCHs) corresponding to the at least one of the PDSCH transmissions, respectively, and wherein the HARQ-ACK signal transmitted on the selected PUCCH resource denotes at least one of acknowledgement (ACK), negative acknowledgement (NACK), or discontinuous transmission (DTX) response for each of the one or more transport blocks.

18. The apparatus of claim 17, wherein the plurality of PUCCH resources comprise a first PUCCH resource for the PDSCH transmission on the first cell, wherein a PDCCH on the first cell comprises at least one control channel element (CCE), and wherein the first PUCCH resource for the PDSCH transmission on the first cell is identified based on a first CCE used for transmission of the corresponding PDCCH and based on a value configured by higher layers.

19. The apparatus of claim 18, wherein a transmission mode of the first cell supports up to two transport blocks, and wherein the plurality of PUCCH resources comprise the first PUCCH resource and a second PUCCH resource for PDSCH transmission on the first cell, and wherein the second PUCCH resource for the PDSCH transmission on the first cell is identified based on the first CCE+1.

20. The apparatus of claim 17, wherein the plurality of PUCCH resources comprise a first PUCCH resource and a second PUCCH resource for the PDSCH transmission on the second cell, wherein a PDCCH on the second cell comprises downlink control information (DCI), and wherein the first PUCCH resource and the second PUCCH resource for the PDSCH transmission on the second cell for a transmission mode of the second cell that supports up to two transport blocks, are determined based on the DCI of the corresponding PDCCH and based on a value configured by higher layers.

21. The apparatus of claim 17, wherein a number of the plurality of PUCCH resources is one of 2, 3 or 4.

22. The apparatus of claim 21, wherein the PUCCH resource is selected according to a format configured based on the ACK, NACK, or DTX response for the each of the one or more transport blocks and based on the number of the plurality of PUCCH resources.

23. The apparatus of claim 17, wherein the HARQ-ACK signal is transmitted by a constellation point on the PUCCH resource.

24. The apparatus of claim 23, wherein the constellation point is mapped to the ACK, NACK, or DTX response for the each of the one or more transport blocks.

25. An apparatus for receiving a hybrid automatic repeat request-acknowledgement (HARQ-ACK) signal in a communication system, the apparatus comprising:

a transmitter configured to transmit one or more transport blocks by at least one of a physical downlink shared channel (PDSCH) transmission on a first cell or a PDSCH transmission on a second cell; and a receiver configured to receive the HARQ-ACK signal for the one or more transport blocks on a physical uplink control channel (PUCCH) resource, wherein the PUCCH resource is selected from a plurality of PUCCH resources, the plurality of PUCCH resources are associated with transmission modes of the first cell and the second cell, wherein at least one of the plurality of PUCCH resources for at least one of the PDSCH transmissions is determined based on at least one of physical downlink control channels (PDCCHs) corresponding to the at least one of the PDSCH transmissions respectively, and wherein the HARQ-ACK signal received on the selected PUCCH resource denotes at least one of acknowledgement (ACK), negative acknowledgement (NACK), or discontinuous transmission (DTX) response for each of the one or more transport blocks.

26. The apparatus of claim 25, wherein the plurality of PUCCH resources comprise a first PUCCH resource for the PDSCH transmission on the first cell, wherein a PDCCH on the first cell comprises at least one control channel element (CCE), and wherein the first PUCCH resource for the PDSCH transmission on the first cell is identified based on a first CCE used for transmission of the corresponding PDCCH and based on a value configured by higher layers.

27. The apparatus of claim 26, wherein a transmission mode of the first cell supports up to two transport blocks, and wherein the plurality of PUCCH resources comprise the first PUCCH resource and a second PUCCH resource for PDSCH transmission on the first cell, and wherein the second PUCCH resource for the PDSCH transmission on the first cell is identified based on the first CCE+1.

28. The apparatus of claim 25, wherein the plurality of PUCCH resources comprise a first PUCCH resource and a second PUCCH resource for the PDSCH transmission on the second cell, wherein a PDCCH on the second cell comprises downlink control information (DCI), and wherein the first PUCCH resource and the second PUCCH resource for the PDSCH transmission on the second cell for a transmission mode of the second cell that supports up to two transport blocks, are determined based on the DCI of the corresponding PDCCH and based on a value configured by higher layers.

29. The apparatus of claim 25, wherein a number of the plurality of PUCCH resources is one of 2, 3 or 4.

30. The apparatus of claim 29, wherein the PUCCH resource is selected according to a format configured based on the ACK, NACK, or DTX response for the each of the one or more transport blocks and based on the number of the plurality of PUCCH resources.

31. The apparatus of claim 25, wherein the HARQ-ACK signal is received by a constellation point on the PUCCH resource.

32. The apparatus of claim 31, wherein the constellation point is mapped to the ACK, NACK, or DTX response for the each of the one or more transport blocks.

* * * * *